(12) United States Patent
Hayashi et al.

(10) Patent No.: US 9,246,683 B2
(45) Date of Patent: Jan. 26, 2016

(54) RE-ENCRYPTION KEY GENERATOR, RE-ENCRYPTION APPARATUS, AND PROGRAM

(71) Applicants: Kabushiki Kaisha Toshiba, Minato-ku (JP); Toshiba Solutions Corporation, Minato-ku (JP)

(72) Inventors: Ryotaro Hayashi, Kawasaki (JP); Tatsuyuki Matsushita, Kawasaki (JP); Yoshihiro Fujii, Tokyo (JP); Takuya Yoshida, Inagi (JP); Koji Okada, Tokyo (JP)

(73) Assignees: KABUSHIKI KAISHA TOSHIBA, Minato-ku (JP); TOSHIBA SOLUTIONS CORPORATION, Minato-ku (JP)

( * ) Notice: Subject to any disclaimer, the term of this patent is extended or adjusted under 35 U.S.C. 154(b) by 176 days.

(21) Appl. No.: 14/063,553

(22) Filed: Oct. 25, 2013

(65) Prior Publication Data
US 2014/0050318 A1    Feb. 20, 2014

Related U.S. Application Data

(63) Continuation of application No. PCT/JP2012/061256, filed on Apr. 26, 2012.

(30) Foreign Application Priority Data

Apr. 27, 2011   (JP) .................................. 2011-099563

(51) Int. Cl.
*H04L 9/00* (2006.01)
*H04L 9/14* (2006.01)
(Continued)

(52) U.S. Cl.
CPC ................ *H04L 9/14* (2013.01); *H04L 9/0861* (2013.01); *H04L 9/3073* (2013.01)

(58) Field of Classification Search
CPC ............................................................ H04L 9/14
USPC ................................................................ 380/46
See application file for complete search history.

(56) References Cited

U.S. PATENT DOCUMENTS

| 5,940,507 | A | 8/1999 | Cane et al. |
| 6,859,533 | B1 | 2/2005 | Wang et al. |
| 2008/0059787 | A1* | 3/2008 | Hohenberger et al. ........ 713/153 |

FOREIGN PATENT DOCUMENTS

| JP | 2001-202010 A | 7/2001 |
| JP | 2003-5953 A | 1/2003 |

(Continued)

OTHER PUBLICATIONS

International Search Report mailed Jul. 31, 2012 for PCT/JP2012/061256 filed on Apr. 26, 2012 with English Translation.

(Continued)

*Primary Examiner* — Farid Homayounmehr
*Assistant Examiner* — Suman Debnath
(74) *Attorney, Agent, or Firm* — Oblon, McClelland, Maier & Neustadt, L.L.P.

(57) ABSTRACT

A re-encryption key generator according to an embodiment generates a re-encryption key required to re-encrypt, without decrypting, ciphertext data obtained by encrypting plaintext data by means of a first public key of a first user device to obtain re-encrypted text data which can be decrypted by a second private key of a second user device. The first storage device stores a first private key corresponding to the first public key. The second storage device stores a second public key corresponding to the second private key. The re-encryption key generation device generates the re-encryption key based on the first private key, the second public key, and the first random number.

13 Claims, 8 Drawing Sheets

(51) Int. Cl.
*H04L 9/30* (2006.01)
*H04L 9/08* (2006.01)

(56) References Cited

FOREIGN PATENT DOCUMENTS

| JP | 2007-73012 A | 3/2007 |
|----|--------------|--------|
| JP | 2010-2959 A  | 1/2010 |

OTHER PUBLICATIONS

International Written Opinion mailed Jul. 31, 2012 for PCT/JP2012/061256 filed on Apr. 26, 2012.
Ateniese, G. et al., Key-Private Proxi Re-encryption, Lecture Notes in Computer Science, vol. 5473, p. 279-294, 2009., especially 3.2 The Construction.
Libert, B. and Vergnaud, D., Unidirectional Chosen-Ciphertext Secure Proxy Re-Encryption, IEEE Transactions on Information Theory, vol. 57, p. 1786-1802, Issue 3, 2011., especially III. Unidirectional Scheme in the Known Secret Key Model.
Office Action issued Apr. 1, 2014, in Japanese Patent Application No. 2013-512438 with English translation.
Search Report and Written Opinion issued Jul. 3, 2014 in Singaporean Patent Application No. 201308146-8.
Office Action issued Jul. 21, 2015 in Japanese Patent Application No. 2014-136166 (with English language translation).
Toshiyuki Isshiki, et al., "Attacks to the Proxy Re-Encryption Schemes from IWSEC2011" Advances in Information and Computer Security, $8^{th}$ International Workshop on Security, IWSEC 2013, LNCS, vol. 8231, 2013, pp. 290-302 and cover pages.

* cited by examiner

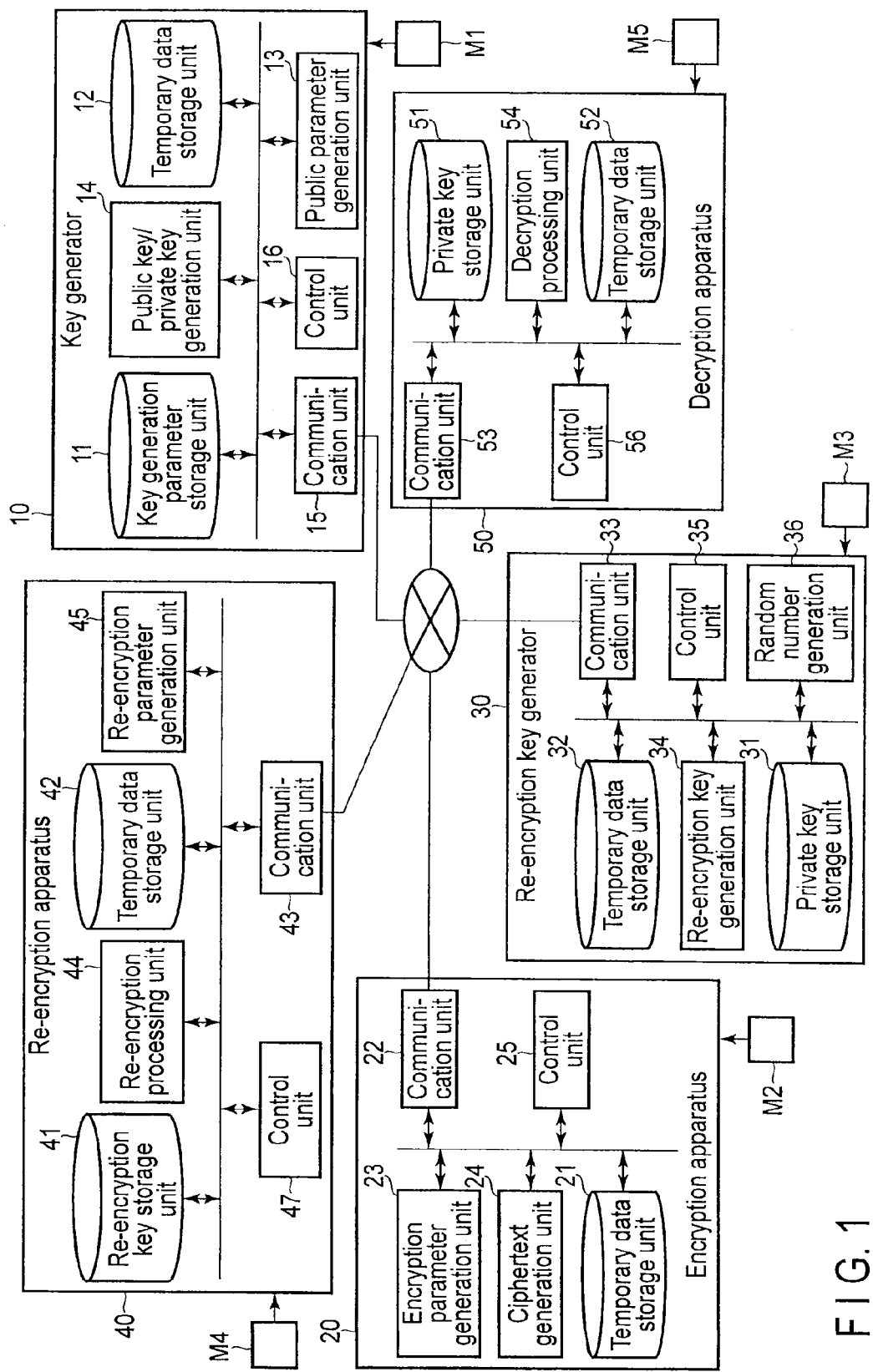
F I G. 1

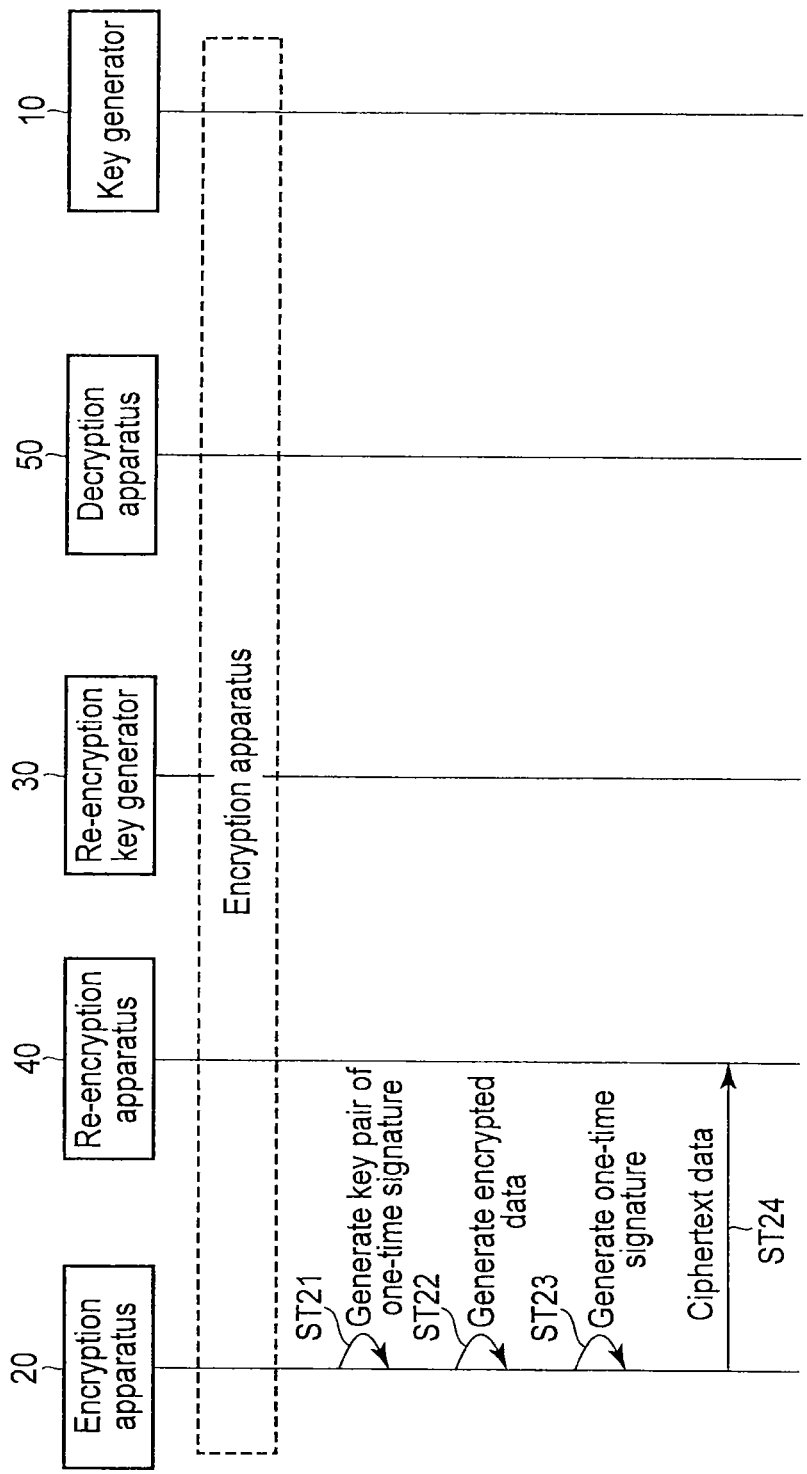
F I G. 3

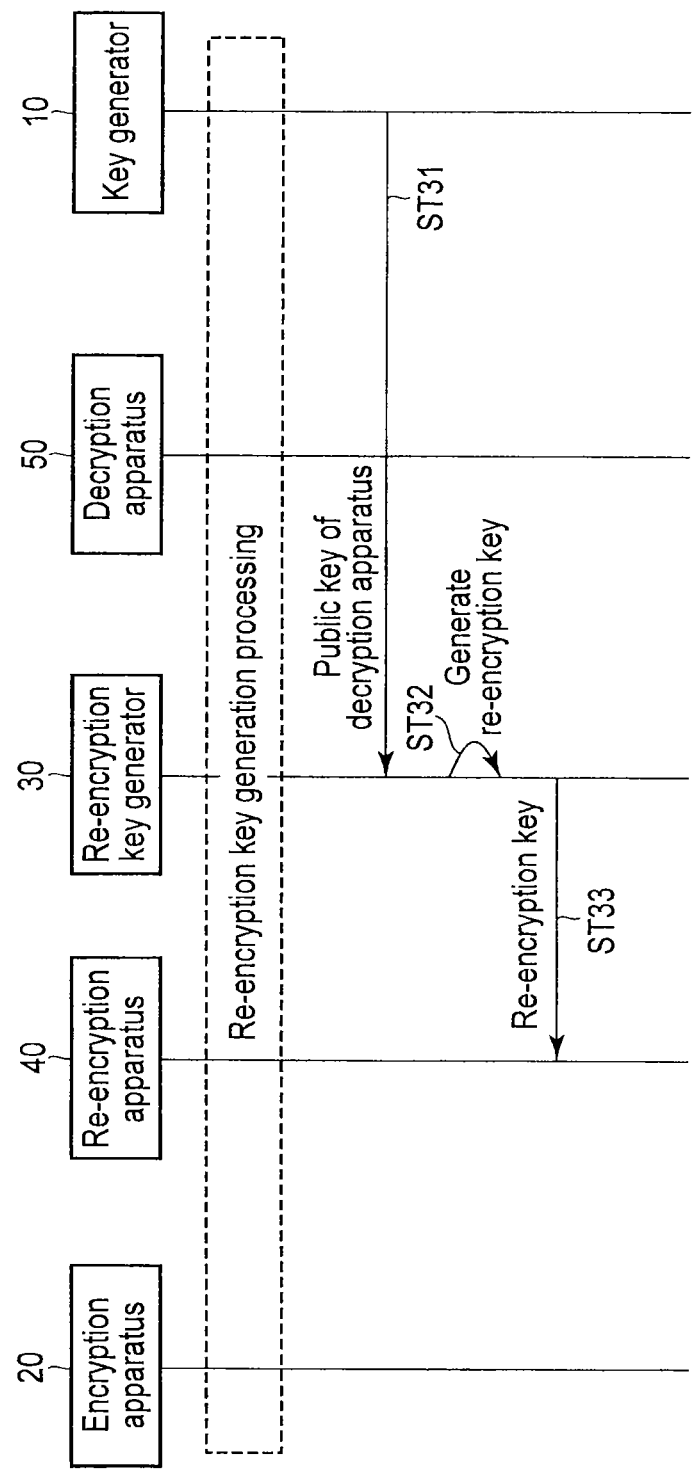
F I G. 4

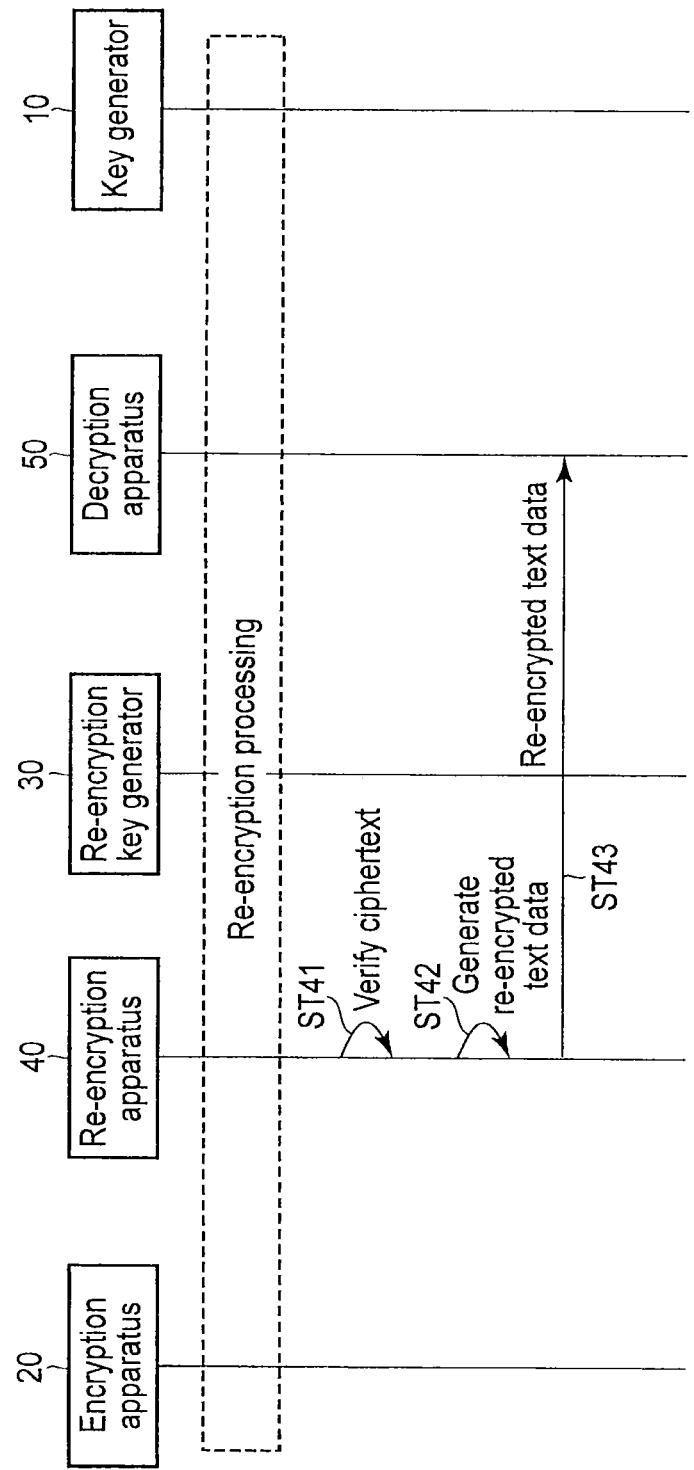
F I G. 5

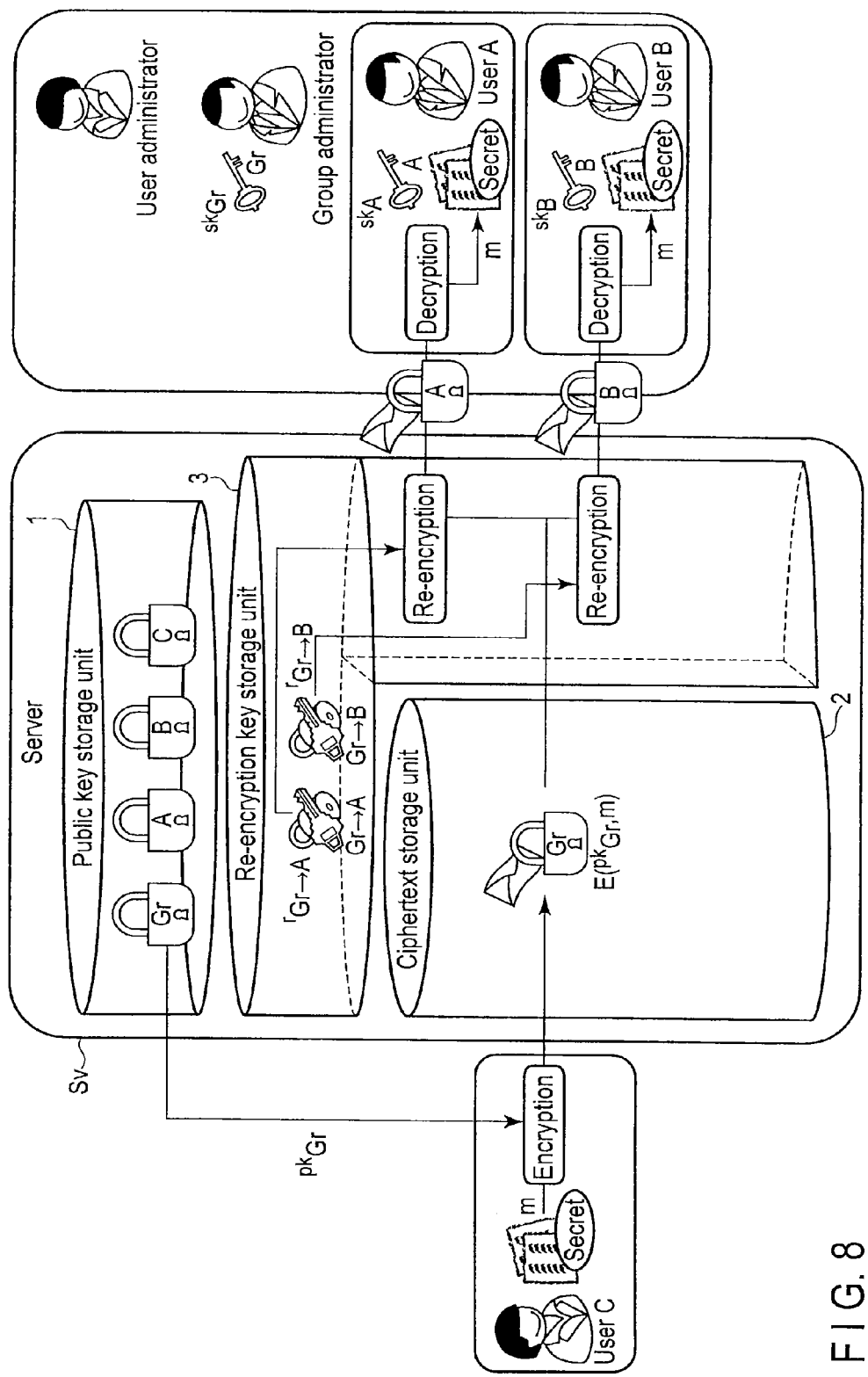
F I G. 8

RE-ENCRYPTION KEY GENERATOR, RE-ENCRYPTION APPARATUS, AND PROGRAM

CROSS-REFERENCE TO RELATED APPLICATIONS

This application is based upon and claims the benefit of priority from Japanese Patent Application No. 2011-99563, filed on Apr. 27, 2011; the entire contents of which are incorporated herein by reference.

FIELD

Embodiments described herein relate generally to a re-encryption key generator, re-encryption apparatus, and program.

BACKGROUND

In a file sharing system in which the user uploads a file onto a server, and that file is shared by a plurality of users, as a method of maintaining the secrecy of file with respect to the server, the following three methods (1) to (3) are used.

(1) An individual key system for encrypting a file by means of an individual encryption key for each user.

(2) A common key system for encrypting a file by means of an encryption key common to respective users.

(3) A re-encryption system for encrypting a file using a proxy re-encryption system.

In the systems (1) to (3), assume that a user A uploads a file onto a server, and the user A shares the file with users B and C.

In the individual key system (1), each user has a pair of a private key and public key, which are different for each user. The user A encrypts a file by means of a public key of the user B, and uploads the encrypted file onto the server. Note that the public key of the user B is an individual encryption key for the user B. Likewise, the user A encrypts a file by means of a public key of the user C, and uploads the encrypted file onto the server. The public key of the user C is an individual encryption key for the user C. That is, the user A encrypts a file individually for the users who share that file.

In the common key system (2), each user shares a pair of a private key and public key, which are common to the respective users. The user A encrypts a file by means of a public key (as an encryption key common to the respective users), and uploads the encrypted file onto the server. The respective users share an identical private key.

In the proxy re-encryption system (3), each user has a pair of a private key and public key, which are different for respective users like in the individual key system (1). However, unlike in the individual key system (1), the user A need only encrypt a file by means of a public key (to be referred to as a group public key hereinafter) of an entity (to be referred to as a group administrator hereinafter) who manages a group of users. The server re-encrypts the encrypted file (uploaded by the user A) based on a re-encryption key. By the re-encryption, an encrypted file which can be decrypted by each user is generated. Details of the proxy re-encryption system will be described later.

In the individual key system (1), when a file is to be shared also by a new user D, the user A has to encrypt a file by means of a public key of the user D, and has to upload the encrypted file onto the server, thus posing a problem. Note that the public key of the user D is an individual encryption key for the user D. Therefore, the system (1) is not suitable for the file sharing system since troublesome processing is required at the time of addition of a new user when the number of new users or the number of files to be shared is large.

In the common key system (2), when a file sharing permission for a certain user is canceled from a certain timing (to exclude that user from the file sharing system), a mechanism for updating the private key and public key common to the respective users is additionally required, thus posing a problem. In the common key system (2), if the private key common to the respective users has leaked due to some reason, a person who acquired the leaked private key can decrypt all encrypted files, thus posing a problem. For this reason, the common key system (2) is not suitable for the file sharing system.

On the other hand, in the proxy re-encryption system (3), since the server re-encrypts one ciphertext to that which can be decrypted by each user, using a re-encryption key, a configuration which does not notify the users of the re-encryption key is adopted, thus solving the aforementioned problems. For this reason, the proxy re-encryption system (3) is suitable for the file sharing system.

However, in the proxy re-encryption system (3), when the server and users collude, a decryption right is re-delegated. More specifically, when the server and users B and E collude, an authentic re-encryption key ($rk_{A \to E}$) required to re-encrypt ciphertext for the user A to that for the user E is generated without any permission of the user A using a re-encryption key ($rk_{A \to B}$) required to re-encrypt ciphertext for the user A to that for the user B, a private key ($sk_B$) of the user B, and a private key ($sk_E$) of the user E.

A solution to such problem of the present invention is to provide a re-encryption key generator, re-encryption apparatus, and program, which cannot generate a re-encryption key without any permission of a transfer source even when the server and users collude.

BRIEF DESCRIPTION OF THE DRAWINGS

FIG. 1 is a block diagram showing the arrangement of a re-encryption system according to the first embodiment.

FIG. 3 is a sequence chart for explaining the operation of encryption processing according to the first embodiment.

FIG. 4 is a sequence chart for explaining the operation of re-encryption key generation processing according to the first embodiment.

FIG. 5 is a sequence chart for explaining the operation of re-encryption processing according to the first embodiment.

FIG. 8 is a diagram of the file sharing system according to the first embodiment.

DETAILED DESCRIPTION

Figure 2:
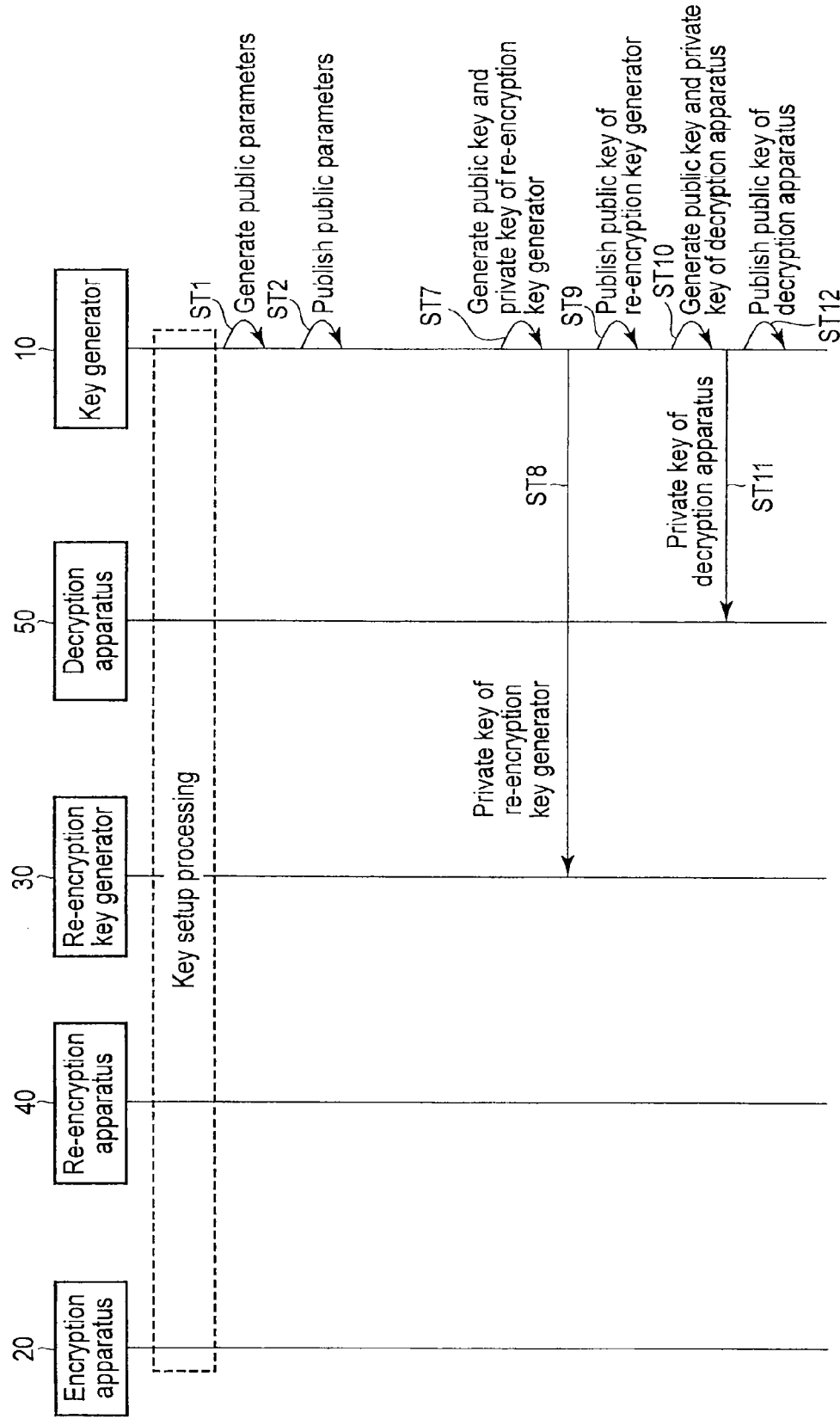
FIG. 2 is a sequence chart for explaining the operation of key setup processing according to the first embodiment.

In general, according to one embodiment, a re-encryption key generator generates a re-encryption key required to re-encrypt, without decrypting, ciphertext data obtained by encrypting plaintext data by means of a first public key of a first user device to obtain re-encrypted text data which can be decrypted by a second private key of a second user device.

The re-encryption key generator comprises a first storage device, a second storage device, a first random number generation device, and a re-encryption key generation device.

The first storage device stores a first private key corresponding to the first public key.

The second storage device stores a second public key corresponding to the second private key.

The first random number generation device generates a first random number.

The re-encryption key generation device generates the re-encryption key based on the first private key, the second public key, and the first random number.

Embodiments will be described hereinafter with reference to the drawings. Note that each of the following apparatuses can be implemented by either a hardware arrangement or a combined arrangement of hardware resources and software. As the software of the combined arrangement, programs, which are installed from a network or non-transitory computer-readable storage media M1 to M5 in a computer in advance, and are executed by processors of the computer to control the computer to implement functions of corresponding apparatuses, as shown in FIG. 1, are used.

First Embodiment

A proxy re-encryption system will be described first. A basic model of the proxy re-encryption system includes five functions (to be also referred to as algorithms hereinafter), that is, key generation, encryption, decryption, re-encryption key generation, and re-encryption. The key generation, encryption, and decryption functions are the same as those of normal public key cryptosystem.

(Key Generation) KeyGen($1^k$)→(pk, sk)

A key generation algorithm KeyGen outputs a pair (pk, sk) of a public key pk and private key sk when a security parameter $1^k$ is input.

(Encryption) Enc($pk_A$, m)→$C_A$

An encryption algorithm Enc outputs ciphertext $C_A$ for a user A when a public key $pk_A$ of the user A and a message m are input.

(Decryption) Dec($sk_A$, $C_A$)→m

A decryption algorithm Dec outputs the message m when a private key $sk_A$ of the user A and the ciphertext $C_A$ for the user A are input.

(Re-Encryption Key Generation) ReKeyGen($pk_A$, $sk_A$, $pk_B$, $sk_B$)→$rk_{A→B}$ A re-encryption key generation algorithm ReKeyGen outputs a re-encryption key $rk_{A→B}$ when the public key $pk_A$ of the user A, the private key $sk_A$ of the user A, a public key $pk_B$ of a user B, and a private key $sk_B$ of the user B are input.

(Re-Encryption) ReEnc($rk_{A→B}$, $C_A$)→$C_B$

A re-encryption algorithm ReEnc outputs ciphertext $C_B$ for the user B when the re-encryption key $rk_{A→B}$ and the ciphertext $C_A$ for the user A are input.

The basic model has been described. However, according to the re-encryption implementation method used, models having different inputs to functions, and those including functions and keys other than those described above have also been proposed.

For example, like in the re-encryption method to be described in this embodiment, a model called "non-interactive", which obviates the need for the private key $sk_B$ of the user B in inputs of the re-encryption key generation algorithm has been proposed. Also, a model in which the re-encryption key $rk_{A→B}$ for the user B and a private key $sk_C$ of a user C are input in place of the private key $sk_A$ of the user A has also been proposed.

In addition, a model called "unidirectional" which allows re-encryption of ciphertext $C_A→C_B$ by means of the re-encryption key $rk_{→B}$, while inhibits inverse conversion of ciphertext $C_B→C_A$, and a model called "bidirectional" which permits that inverse conversion are known. Note that in the bidirectional model, the re-encryption key $rk_{A→B}$ is also expressed as $rk_{A↔B}$.

Furthermore, a system based on ID-based encryption of the public key cryptosystem has been proposed. In this case, function setup processing is added for master key generation, and a master key and ID are added to inputs of the key generation algorithm. In the ID-based encryption, the public key pk is an ID itself.

Figure 7:
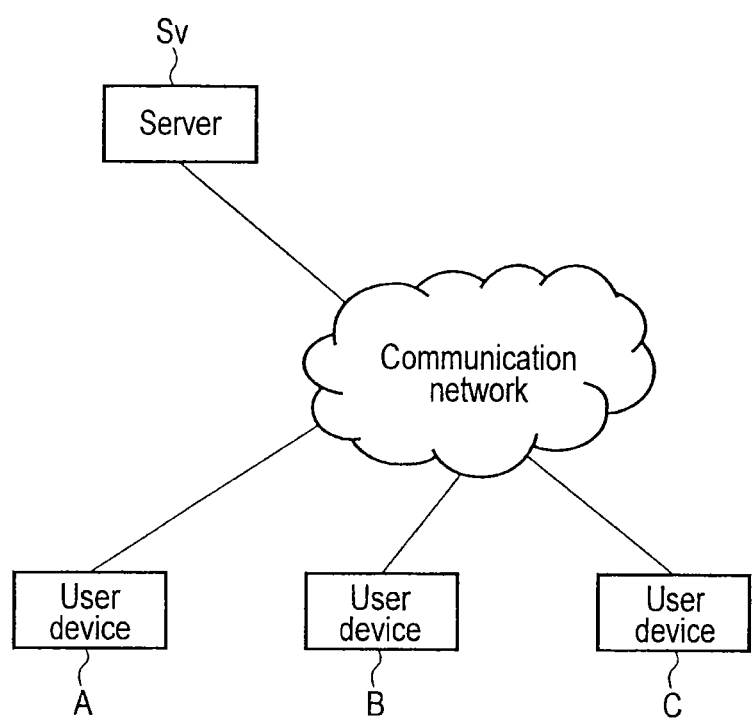
FIG. 7 is a block diagram showing an example of the arrangement of a file sharing system according to the first embodiment.

The arrangement of a file sharing system according to this embodiment will be described below with reference to FIG. 7. The file sharing system includes a server Sv as an information processing apparatus possessed by a service provider which provides a service, and user devices A, B, C, . . . as information processing apparatuses possessed by users of that service. The server Sv and user devices A, B, C, . . . are connected via a communication network. The communication network includes, for example, a wireless LAN (Local Area Network), wired LAN, optical communication network, telephone communication network, intranet, Ethernet™, Internet, and combinations thereof. Note that FIG. 7 shows only one server Sv connected to the file sharing system, but a plurality of servers may be connected. Also, the user devices A, B, C, . . . will also simply referred to as users A, B, C, . . . , or will be referred to as a first user device, second user device, . . . hereinafter.

FIG. 8 is a diagram showing the file sharing system. This file sharing system includes a server Sv, user A, user B, user C, group administrator, and user administrator. The user administrator is an entity for managing all the users. The user administrator issues an ID and initial password which allow each user to log into the file sharing system for the user.

As an advance preparation, assume that each user has a public key $pk_{Gr}$ of the group administrator. Also, let m be file of plaintext to be shared. Assume that the server Sv has a re-encryption key $rk_{Gr→A}$ (or $rk_{Gr→B}$ or $rk_{Gr→C}$) required to re-encrypt ciphertext E($pk_{Gr}$, m) for the group administrator to ciphertext E($pk_A$, m) (or E($pk_B$, m) or E($pk_C$, m)) for the user A (or the user B or user C). Assume that each user i has a private key $sk_i$. That is, the user A has a private key $sk_A$, the user B has a private key $sk_B$, and the user C has a private key $sk_C$.

Next, the user C encrypts the file m by means of the public key $pk_{Gr}$ of the group administrator, which is stored in a public key storage unit 1, and uploads obtained ciphertext E($pk_{Gr}$, m) onto the server Sv. The server Sv stores this ciphertext in a ciphertext storage unit 2.

Now assume that the user A wants to share the file m. The user A transmits a re-encryption request of the ciphertext E($pk_{Gr}$, m) to the server Sv. In response to the request received from the user A, the server Sv re-encrypts the ciphertext E($pk_{Gr}$, m) to ciphertext E($pk_A$, m) for the user A based on the re-encryption key $rk_{Gr→A}$ for the user A stored in a re-encryption key storage unit 3, and transmits the obtained re-encrypted text E($pk_A$, m) to the user A. Note that the re-encrypted text is ciphertext obtained by re-encrypting ciphertext.

The user A decrypts the re-encrypted text E($pk_A$, m) downloaded from the server Sv by means of the private key $sk_A$ in his or her possession, and uses the obtained file m.

In the aforementioned file sharing system, the file m has never been decrypted from encryption by the user C until decryption by the user A, thus blocking information leakage during the processes of file sharing.

The user C need not determine file sharing users at the cipher text upload timing. That is, the user C need only encrypt the file m by means of the public key $pk_{Gr}$ of the group administrator, and requires only the public key $pk_{Gr}$ of the group administrator as a key to be managed in association with encryption, thus reducing the key management cost.

In this file sharing system, the server Sv does not have any decryption key $sk_{Gr}$ required to decrypt the ciphertext $E(pk_{Gr}, m)$. Therefore, the server Sv cannot decrypt this ciphertext. This means that there is no threat of leakage of ciphertext decrypted by the illicit server Sv, thus the server Sv need not be managed so strictly, resulting in a management cost reduction of the server Sv.

The same applies to a case of file sharing by the user B.

FIG. 1 is a block diagram showing the arrangement of a re-encryption system according to the first embodiment. (The correspondence relationship between FIGS. 1 and 8 will be described later.) This re-encryption system includes a key generator 10, encryption apparatus 20, re-encryption key generator 30, re-encryption apparatus 40, and decryption apparatus 50. Note that the key generator 10 generates various parameters of the re-encryption system, and a pair of keys; a public key and private key of the apparatuses 40 and 50.

The encryption apparatus 20 transmits ciphertext data obtained by encrypting plaintext data using a public key corresponding to a private key of the re-encryption key generator 30 to the re-encryption apparatus 40.

The re-encryption key generator 30 generates a re-encryption key using the private key of the re-encryption key generator 30, a public key of the decryption apparatus 50, and a random number.

The re-encryption apparatus 40 transmits re-encrypted text data obtained by re-encrypting, without decrypting, the ciphertext data received from the encryption apparatus 20 by means of the re-encryption key to the decryption apparatus 50.

The decryption apparatus 50 verifies the re-encrypted text data using a public key of the re-encryption key generator 30, and decrypts the re-encrypted text data using a private key corresponding to a public key of the apparatus 50, thus obtaining plaintext data. Note that a plurality of apparatuses may be arranged as each of the re-encryption key generator 30, re-encryption apparatus 40, and decryption apparatus 50, but this embodiment will exemplify a case in which the system includes one each as these apparatuses.

The correspondence relationship between FIGS. 1 and 8 will be described below. The apparatuses 10 to 50 are held by entities which execute the corresponding processes. If a user generates a pair of a public key and private key of himself or herself, the user holds the key generator 10. Note that when, for example, the user administrator or group administrator generates a pair of a public key and private key of each user, the user administrator or group administrator holds the key generator 10. The user holds one or both of the encryption apparatus 20 and decryption apparatus 50. The group administrator holds the re-encryption key generator 30. Note that when, for example, the user administrator or server Sv generates a re-encryption key, it holds the re-encryption key generator 30. The server Sv holds the re-encryption apparatus 40. In the file sharing system exemplified in FIG. 8, the server Sv holds the public key storage unit 1, and the user C who executes encryption acquires a public key used in encryption from the public key storage unit 1. However, the present invention is not limited to this, and the user C may acquire the public key used in encryption from the key generator 10 (which generates the public key used in encryption). Also, the server Sv stores the ciphertext $E(pk_{Gr}, m)$ generated by the user C in the ciphertext storage unit 2. Alternatively, the ciphertext storage unit 2 may be included in the re-encryption apparatus 40 or may be an external storage device which is not included in the re-encryption apparatus 40.

The entities and apparatuses to be held by the entities are not limited to the aforementioned example, and various variations are possible. The user administrator or group administrator may or may not also serve as the user. The respective user devices used by the respective users may also be referred to as a first user device, second user device, . . . . Likewise, public keys and private keys of the respective user devices may also be referred to as a first public key and first private key of the first user device, a second public key and second private key of the second user device, . . . .

The arrangements of the respective apparatuses 10 to 50 will be described in detail below.

The key generator 10 includes a key generation parameter storage unit 11, temporary data storage unit 12, public parameter generation unit 13, public key/private key generation unit 14, communication unit 15, and control unit 16.

The key generation parameter storage unit 11 is a storage device which stores key generation parameters.

The temporary data storage unit 12 is a storage device which stores temporary data such as intermediate processing data, processing result data, and the like of the respective generation units 13 and 14.

The public parameter storage unit 13 generates public parameters of key generation.

The public key/private key generation unit 14 generates a public key and private key for each user.

The communication unit 15 is a communication interface required to communicate with other apparatuses 20 to 50, and has, for example, the following functions (f15-1) and (f15-2).

(f15-1) A function of transmitting public key/private key pairs of 30 and 50 in the temporary data storage unit 12 to the apparatuses 30 and 50 under the control of the control unit 16.

(f15-2) A function of transmitting a public key of the re-encryption key generator 30 in the temporary data storage unit 12 to the encryption apparatus 20 under the control of the control unit 16.

Note that in the following description, a description about mediation of the communication unit 15 and transmission/reception timings may be omitted to avoid redundant descriptions. The same applies to communication units of other apparatuses 20 to 50.

The control unit 16 has a function of controlling the units 11 to 15 to execute the operations shown in FIG. 2.

The encryption apparatus 20 includes a temporary data storage unit 21, communication unit 22, encrypted data generation unit 23, ciphertext generation unit 24, and control unit 25.

The temporary data storage unit 21 is a storage device which stores the public key of the re-encryption key generator 30 received from the key generator 10, and tentative data (to be also referred to as temporary data hereinafter) such as intermediate processing data and processing result data of the generation units 23 and 24.

The communication unit 22 is a communication interface required to communicate with other apparatuses 10 and 30 to 50, and has, for example, the following functions (f22-1) and (f22-2).

(f22-1) A function of acquiring the public key of the re-encryption key generator 30 published by the key generator 10 and writing the acquired public key in the temporary data storage unit 21.

(f22-2) A function of transmitting ciphertext data in the temporary data storage unit 21 to the re-encryption apparatus 40 under the control of the control unit 25.

The encryption parameter generation unit 23 has a function of generating encryption parameters.

The ciphertext generation unit 24 has, for example, the following functions (f24-1) and (f24-2).

(f24-1) A function of generating ciphertext data by encrypting plaintext data using the public key (the first public key of the first user device) of the re-encryption key generator 30, which key is read out from the temporary data storage unit 21.

(f24-2) A function of writing the obtained ciphertext data in the temporary storage unit 21.

The control unit 25 has a function of controlling the respective units 21 to 24 so as to execute operations shown in FIG. 3.

The re-encryption key generator 30 includes a private key storage unit 31, temporary data storage unit 32, communication unit 33, re-encryption key generation unit 34, control unit 35, and random number generation unit 36.

The private key storage unit 31 is a storage device which stores the private key of the re-encryption key generator 30 received from the key generator 10.

The temporary data storage unit 32 is a storage device which stores the public key of the decryption apparatus 50 received from the key generator 10, and temporary data such as intermediate processing data and processing result data of the re-encryption key generation unit 34.

The communication unit 33 is a communication interface required to communicate with other apparatuses 10, 20, 40, and 50, and has, for example, a function of transmitting the re-encryption key in the temporary data storage unit 32 to the re-encryption apparatus 40 under the control of the control unit 35.

The re-encryption key generation unit 34 has, for example, the following functions (f34-1) and (f34-2).

(f34-1) A function of generating a re-encryption key based on the private key (the first private key of the first user device) of the re-encryption key generator 30, which key is read out from the private key storage unit 31, the public key (the second public key of the second user device) of the decryption apparatus 50, which key is read out from the temporary data storage unit 32, and a random number generated by the random number generation unit 36 (this function does not require any parameter (more specifically, a random number) at the time of encryption).

(f34-2) A function of writing this re-encryption key in the temporary data storage unit 32.

The control unit 35 has a function of controlling the respective units 31 to 34 and 36 so as to execute the operations shown in FIG. 4.

The random number generation unit 36 has a function of generating and outputting a random number to the re-encryption key generation unit 34.

The re-encryption apparatus 40 includes a re-encryption key storage unit 41, temporary data storage unit 42, communication unit 43, re-encryption processing unit 44, re-encryption parameter generation unit 45, and control unit 47.

The re-encryption key storage unit 41 is a storage device which stores the re-encryption key received from the re-encryption key generator 30.

The temporary data storage unit 42 is a storage device which stores temporary data such as intermediate processing data and processing result data of the re-encryption processing unit 44.

The communication unit 43 is a communication interface required to communicate with other apparatuses 10 to 30 and 50, and has, for example, the following functions (f43-1) and (f43-2).

(f43-1) A function of outputting ciphertext data received from the encryption apparatus 20 to the re-encryption processing unit 44.

(f43-2) A function of transmitting re-encrypted text data in the temporary data storage unit 42 to the decryption apparatus 50 under the control of the control unit 47.

The re-encryption processing unit 44 has, for example, the following functions (f44-1) and (f44-2).

(f44-1) A function of obtaining re-encrypted text by re-encrypting, without decrypting, ciphertext data received from the encryption apparatus 20 using the re-encryption key read out from the re-encryption key storage unit 41.

(f44-2) A function of writing the obtained re-encrypted text data in the temporary data storage unit 42.

The control unit 47 has a function of controlling the respective units 41 to 45 so as to execute an operation for delivering a re-encrypted text verification program (not shown) and operations shown in FIG. 5.

The decryption apparatus 50 includes a private key storage unit 51, temporary data storage unit 52, communication unit 53, decryption processing unit 54, and control unit 56.

The private key storage unit 51 is a storage device which stores the private key of the apparatus 50 received from the key generator 10.

The temporary data storage unit 52 is a storage device which stores the public key of the apparatus 50 and that of the re-encryption key generator 30, which keys are received from the key generator 10, and temporary data such as intermediate processing data and processing data of the decryption processing unit 54.

The communication unit 53 is a communication interface required to communicate with other apparatuses 10 to 40, and has, for example, the following functions (f53-1) to (f53-3).

(f53-1) A function of writing the private key of the apparatus 50 received from the key generator 10 in the private key storage unit 51.

(f53-2) A function of writing the public key of the apparatus 50 and that of the re-encryption key generator 30, which keys are received from the key generator 10, in the temporary data storage unit 52.

(f53-3) A function of outputting re-encrypted data received from the re-encryption apparatus 40 to the decryption processing unit 54.

The decryption processing unit 54 has, for example, the following functions (f54-1) to (f54-2).

(f54-1) A function of obtaining plaintext data by decrypting re-encrypted text data received from the re-encryption apparatus 40 based on the private key (the second private key of the second user device) of the decryption apparatus 50, which key is read out from the private key storage unit 51.

(f54-2) A function of writing the obtained plaintext data in the temporary data storage unit 52.

Figure 6:
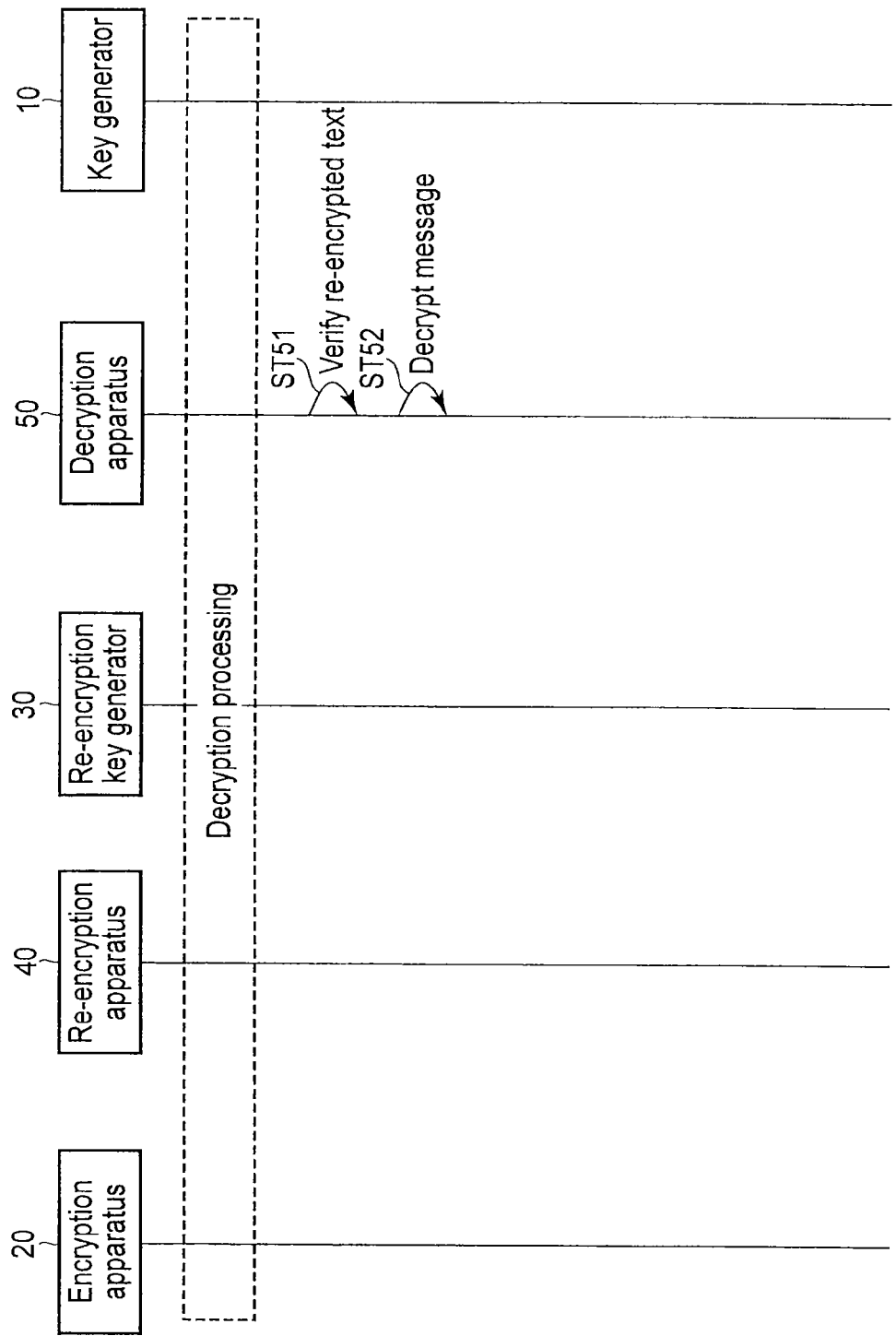
FIG. 6 is a sequence chart for explaining the operation of decryption processing according to the first embodiment.

The control unit 56 has a function of controlling the respective units 51 to 54 so as to execute operations shown in FIG. 6.

The operations of the re-encryption system with the aforementioned arrangement will be described below with reference to the sequence charts shown in FIGS. 2, 3, 4, 5, and 6.

The following operations will be described taking, as an example, a case in which they are executed in an order of (1) key setup processing, (2) encryption processing, (3) re-encryption key generation processing, (4) re-encryption processing, and (5) decryption processing. However, the following operations need not always be executed in the aforementioned order. For example, the re-encryption key generation may be executed before the encryption processing. Also, ciphertext data may be decrypted without executing the re-encryption processing.

(1) The key setup processing is executed by the key generator 10, as shown in FIG. 2 and following steps ST1 to ST12.

Initially, the public parameter generation unit 13 of the key generator 10 generates or externally acquires public parameters (p, $\lambda$, G, $G_T$, g, $g_1$, $g_2$, u, v, Sig($\hat{G},\hat{S},\hat{V}$)) (step ST1). More specifically, the pubic parameter generation unit 13 generates, based on a security parameter $\lambda$ stored in advance in the key parameter storage unit 11, bilinear map groups (G, $G_T$) which satisfy the prime order p>$2^\lambda$, members g, $g_1$, $g_2$, u, and v of G, and a one-time signature algorithm Sig($\hat{G},\hat{S},\hat{V}$)) which satisfies strong unforgeability. Note that $Z_p$* is a set of integers (=(Z/pZ)*) which are coprime to $Z_p$ and p, and may also be called a multiplicative group $Z_p$* for the prime p. $Z_p$ is a set (=(Z/pZ)) of integers not less than 0 and less than p. The term "member" is a term having a mathematical meaning, is also called an element, and indicates each individual one in a set including a plurality of "ones". Also, in the one-time signature algorithm Sig($\hat{G},\hat{S},\hat{V}$) (to be also referred to as "Sig" hereinafter), $\hat{G}$ means a function of generating a one-time key pair (ssk, svk), $\hat{S}$ means a function of generating a signature $\sigma$ for a message M, and $\hat{V}$ means a function of verifying authenticity of the signature $\sigma$.

As for details of the one-time signature, please refer to [A. Menezes, P. van Oorschot, S. Vanstone, "Handbook of Applied Cryptography", CRC Press, (1996) pp. 462-471, (1996)].

The bilinear map (to be expressed by "e") is a map e: G×G→$G_T$, and satisfies the following three properties.

1. For arbitrary (g, h)∈G×G and a, b∈Z, e($g^a$, $h_b$)=e(g, h)$^{ab}$ holds where Z is a set of integers.

2. For arbitrary (g, h)∈G×G, e(g, h) is calculable.

3. When g, h≠$1_G$, e(g, h)≠$1_{GT}$ always holds where $1_G$ is a unit member of G, and $1_{GT}$ is a unit member of $G_T$.

The bilinear map groups (expressed by G and $G_T$) are groups of prime orders p including the bilinear map e: G×G→$G_T$. If $g_1=g^\alpha$ and $g_2=g^\beta$ for the members g, $g_1$, and $g_2$ of G, the aforementioned definition means that the following equation holds:

$$e(g_1g_2, g) =$$
$$e(g, g_1g_2) = e(g, g^\alpha \cdot g^\beta) = e(g, g^{\alpha+\beta}) = e(g, g)^{\alpha+\beta} = e(g, g)^\alpha \cdot e(g, g)^\beta$$

(where $\alpha$ and $\beta$ are power indices related to the members g, $g_1$, and $g_2$ of G).

Note that the plurality of members g, $g_1$, and $g_2$ of G are a plurality of predetermined system fixed values. The plurality of system fixed values are not limited to the three members of the bilinear map group G, and a plurality of members (for example, two or four or more members) of G can be used as needed. The term "system fixed value" may be read as "fixed value", "member", or "system parameter". The plurality of system fixed values are a plurality of members of a bilinear map group as a group of prime orders including a bilinear map.

This specification adopts a notation which assumes both G and $G_T$ as multiplicative groups. However, the present invention is not limited to this, and G and $G_T$ can be expressed by a notation which regards them as additive groups. That is, for example, G may be expressed as an additive group, and $G_T$ may be expressed as a multiplicative group. As the bilinear map, a map e: $G_1 \times G_2 \to G_T$ for bilinear map groups $G_1$, $G_2$, and $G_T$ ($G_1$ and $G_2$ are different groups) may be used. The same applies to other embodiments.

Subsequently, the public parameter generation unit 13 writes the generated public parameters in the temporary data storage unit 12. The key generator 10 publishes the public parameters (p, $\lambda$, G, $G_T$, g, $g_1$, $g_2$, u, v, Sig) in the temporary data storage unit 12 (step ST2). Note that when the public parameters have already been published before execution of step ST1, these public parameters may be written in the temporary data storage unit 12, and steps ST1 and ST2 may be skipped.

Letting i be identification information of the re-encryption key generator 30, the public key/private key generation unit 14 generates a private key $x_i$, $y_i$, $z_i \in Z_p$*, and generates a public key $pk_i=(X_i, Y_{1i}, Y_{2i}, Z_i, Z_{1i})$ (for $X_i=g^{x_i}$, $Y_{1i}=g_1^{y_i}$, $Y_{2i}=g_2^{y_i}$, $Z_i=g^{z_i}$, and $Z_{1i}=g_1^{z_i}$) of the re-encryption key generator 30 using this private key $sk_i=(x_i, y_i, z_i)$ (step ST7).

Subsequently, the public key/private key generation unit 14 writes the generated public key/private key pair in the temporary data storage unit 12. The communication unit 15 transmits the private key $sk_i$ in the temporary data storage unit 12 to the re-encryption key generator 30 under the control of the control unit 16 (step ST8). The key generator 10 publishes the public key $pk_i$ of the re-encryption key generator 30 in the temporary data storage unit 12 (step ST9).

Likewise, letting j be identification information of the decryption apparatus 50, the public key/private key generation unit 14 generates a private key $sk_j=(x_j, y_j, z_j)$ of the decryption apparatus 50, and generates a public key $pk_j=(X_j, Y_{1j}, Y_{2j}, Z_j, Z_{1j})$ (for $X_j=g^{x_j}$, $Y_{1j}=g_1^{y_j}$, $Y_{2j}=g_2^{y_j}$, $z_j=g^{z_j}$, and $z_{1j}=g_1^{z_j}$) of the re-encryption key generator 30 using this private key $sk_j=(x_j, y_j, z_j)$ (step ST10).

Then, the public key/private key generation unit 14 writes the generated public key/private key pair in the temporary data storage unit 12. The communication unit 15 transmits the private key $sk_j$ in the temporary data storage unit 12 to the decryption apparatus 50 under the control of the control unit 16 (step ST11). The key generator 10 publishes the public key $pk_j$ of the decryption apparatus 50 in the temporary data storage unit 12 (step ST12). Also, if required, the same processes as those in steps ST10 to ST12 may be executed for a private key $sk_h$ and public key $pk_h$ of the encryption apparatus 20, the private key $sk_h$ may be transmitted to the encryption apparatus 20, and the public key $pk_h$ may be published.

With the above processes, the key setup processing is complete. After that, the apparatuses 20, 30, 40, and 50 can acquire and use the public parameters and public keys published in steps ST2, ST6, ST9, and ST12 as needed.

(2) The encryption processing is executed by the encryption apparatus 20, as shown in FIG. 3 and following steps ST21 to ST24.

That is, the encryption parameter generation unit 23 of the encryption apparatus 20 generates a key pair (ssk, svk)=$\hat{G}(\lambda)$ of a signature key ssk and verification key svk in the one-time signature using the security parameter $\lambda$ and the key pair generation function $\hat{G}$ in the public parameters (step ST21), and sets the verification key svk in encrypted data $C_1$ ($C_1$=svk).

Also, the encryption parameter generation unit 23 generates a random number r∈$Z_p$*, and outputs it to the ciphertext generation unit 24.

The ciphertext generation unit 24 generates encrypted data $C_{2X}$, $C_{2Y}$, $C_{2Z}$, $C_{2Z1}$, $C_3$, and $C_4$ for a message m∈$G_T$ as plaintext data using this random number r and the public key pk$_i$ of the re-encryption key generator 30 (step ST22). These encrypted data are respectively given by:

$$C_{2X}=X_i^r, C_{2Y}=Y_{1i}^r, C_{2Z}=Z_i^r, C_{2Z1}=Z_{1i}^r,$$

$$C_3=e(g_1,g_2,g)^r \cdot m, C_4=(u^{svk} \cdot v)^r$$

After completion of step ST22, the ciphertext generation unit 24 generates, for the encrypted data C$_3$ and C$_4$, a one-time signature σ by means of the signature generation function $\hat{S}$ in the public parameters and the signature key ssk generated in step ST21 (step ST23). The signature σ is described by:

$$\sigma = \hat{S}(C_3, C_4))$$

After that, the ciphertext generation unit 24 generates ciphertext data C$_i$=(C$_1$, C$_{2X}$, C$_{2Y}$, C$_{2Z}$, C$_{2Z1}$, C$_3$, C$_4$, σ) including all the encrypted data C$_1$ to C$_4$ and the one-time signature σ, and writes the obtained ciphertext data in the temporary data storage unit 21. Note that the ciphertext data C$_i$=(C$_1$, C$_{2X}$, C$_{2Y}$, C$_{2Z}$, C$_{2Z1}$, C$_3$, C$_4$, σ) may be modified to ciphertext data C$_i$=(C$_{2X}$, C$_{2Y}$, C$_{2Z}$, C$_{2Z1}$, C$_3$) by omitting verification data (C$_1$, C$_4$, σ) which is not used in decryption when verification is skipped. In this case, the processing for generating the verification data (C$_1$, C$_4$, σ) is also skipped.

In either case, the communication unit 22 transmits the ciphertext data C$_i$ in the temporary data storage unit 21 to the re-encryption apparatus 40 under the control of the control unit 25 (step ST24).

With the above processes, the encryption processing is complete.

Note that in this embodiment, verification may be skipped and generation of the verification data may be skipped, as described above (or as will be described later). This applies to the following embodiments and modifications.

(3) The re-encryption key generation processing is executed by the re-encryption key generator 30, as shown in FIG. 4 and following steps ST31 to ST33.

That is, the communication unit 33 of the re-encryption key generator 30 acquires the public key pk$_j$ of the decryption apparatus 50 published from the key generator 10 and writes it in the temporary data storage unit 32 under the control of the control unit 35 (step ST31). Also, in step ST5 described above, the communication unit 33 received the private key sk$_i$ of the re-encryption key generator 30 from the key generator 10 and wrote it in the private key storage unit 31.

The random number generation unit 36 generates a random number θ∈Z$_p$*, and outputs it to the re-encryption key generation unit 34.

The re-encryption key generation unit 34 generates a re-encryption key R$_{ij}$ based on this random number θ, the private key sk$_i$ of the re-encryption key generator 30 in the private key storage unit 31, and the public key pk$_j$ of the decryption apparatus 50 in the temporary data storage unit 32 (step ST32). The re-encryption key R$_{ij}$ is described by:

$$R_{ij} = (R_{ij1}, R_{ij2}, R_{ij3})$$

for $$R_{ij1} = (X_j \cdot g^\theta)^{1/x_i} = g^{\frac{x_j+\theta}{x_i}}, R_{ij2} = (Y_{2j} \cdot g^\theta)^{1/y_i} = g^{\frac{\beta y_j+\theta}{y_i}},$$

$$R_{ij3} = (X_j \cdot Y_{2j} \cdot g^\theta)^{1/z_i} = g^{\frac{x_j+\beta y_j+\theta}{z_i}}.$$

Note that in the above, equations are described by rewriting g$_1$=g$^\alpha$ and g$_2$=g$^\beta$.

After that, the re-encryption key generation unit 34 writes the generated re-encryption key R$_{ij}$ in the temporary data storage unit 32. The communication unit 33 transmits the re-encryption key R$_{ij}$ in the temporary data storage unit 32 to the re-encryption apparatus 40 under the control of the control unit 35 (step ST33).

With the above processes, the re-encryption key generation processing is complete.

(4) The re-encryption processing is executed by the re-encryption apparatus 40, as shown in FIG. 5 and following steps ST41 to ST43.

The communication unit 43 of the re-encryption apparatus 40 writes the ciphertext data C$_i$ transmitted in step ST24 and the re-encryption key R$_{ij}$ transmitted in step ST33 in the temporary data storage unit 42.

The re-encryption processing unit 44 verifies the ciphertext data C$_i$ in the temporary data storage unit 42 using the public parameters and the following verification formulas (step ST41).

$$e(C_{2X}, u^{C_1} \cdot v) = e(X_i, C_4)$$

$$e(C_{2Y}, u^{C_1} \cdot v) = e(Y_{1i}, C_4)$$

$$e(C_{2Z}, u^{C_1} \cdot v) = e(Z_i, C_4)$$

$$e(C_{2Z1}, u^{C_1} \cdot v) = e(Z_{1i}, C_4)$$

$$\mathcal{V}(C_1, \sigma, (C_3, C_4)) = 1$$

Note that when all five verification formulas hold, the verification has succeeded; when at least one verification formula does not hold, the verification has failed.

If the verification has succeeded, the re-encryption parameter generation unit 45 generates three random numbers s, t, and k∈Z$_p$*, and outputs them to the re-encryption processing unit 44.

The re-encryption processing unit 44 generates re-encrypted data C$_{2X'}$, C$_{2X''}$, C$_{2Y'}$, C$_{2Z'}$, C$_{2Z''}$, C$_{2Z1'}$, C$_{2Z1''}$, C$_{2'''}$, C$_X$, C$_{5Y}$, and C$_{5Z}$ using these random numbers s, t, and k, the ciphertext data C$_i$ in the temporary data storage unit 42, and the re-encryption key R$_{ij}$ in the temporary data storage unit 42 (step ST42). These re-encrypted data are respectively described by:

$$C'_{2X} = X_i^s, C''_{2X} = C_{2X}^s = X_i^{rs}, C'_{2Y} = Y_{1i}^t,$$

$$C''_{2Y} = C'_{2Y} = Y_{1i}^{rt}, C'_{2Z} = Z_i^k, C''_{2Z} = C_{2Z}^k = Z_i^{rk}, C'_{2Z1} = Z_{1i}^k,$$

$$C''_{2Z1} = C'_{2Z1} = Z_{1i}^{rk}, C_{5X} = R_{ij1}^{\frac{1}{s}}, C_{5Y} = R_{ij2}^{\frac{1}{t}}, C_{5Z} = R_{ij3}^{\frac{1}{k}}$$

After completion of step ST42, the re-encryption processing unit 44 replaces the encrypted data C$_{2X}$, C$_{2Y}$, C$_{2Z}$, and C$_{2Z1}$ in the ciphertext data C$_i$ by all the encrypted data re-encrypted data C$_{2X'}$ to C$_{5Z}$ to generate re-encrypted text data C$_j$=(C$_1$, C$_{2X'}$, C$_{2X''}$, C$_{2Y'}$, C$_{2Y''}$, C$_{2Z'}$, C$_{2X''}$, C$_{2Z1'}$, C$_{2Z1''}$, C$_{2'''}$, C$_{5X}$, C$_{5Y}$, C$_{5Z}$, C$_3$, C$_4$, σ), and writes the obtained re-encrypted text data C$_j$ in the temporary data storage unit 42. Note that the re-encrypted text data C$_j$=(C$_1$, C$_{2X'}$, C$_{2X''}$, C$_{2Y'}$, C$_{2Y''}$, C$_{2Z'}$, C$_{2X''}$, C$_{2Z1'}$, C$_{2Z1''}$, C$_{2'''}$, C$_{5X}$, C$_{5Y}$, C$_{5Z}$, C$_3$, C$_4$, σ) may be modified to C$_j$=(C$_{2X''}$, C$_{2Y'}$, C$_{2X''}$, C$_{2Z1''}$, C$_{5X}$, C$_{5Y}$, C$_{5Z}$, C$_3$, C$_4$, σ) by omitting verification data (C$_1$, C$_{2X'}$, C$_{2Y'}$, C$_{2Z'}$, C$_{2Z1'}$, C$_{2'''}$, C$_4$, σ) which is not used in decryption when the verification is skipped. In this case, the processing for generating the verification data (C$_{2X'}$, C$_{2Y'}$, C$_{2Z'}$, C$_{2Z1'}$, C$_{2'''}$) is also skipped.

In either case, the communication unit 43 transmits the re-encrypted text data C$_j$ in the temporary data storage unit 42 to the decryption apparatus 50 under the control of the control unit 47 (step ST43).

With the above processes, the re-encryption processing is complete.

(5) The decryption processing is executed by the decryption apparatus 50, as shown in FIG. 6 and following steps ST51 and ST52.

That is, the communication unit 53 of the decryption apparatus 50 receives the re-encrypted text data $C_j$ transmitted in step ST43, and writes it in the temporary data storage unit 52.

The decryption processing unit 54 verifies the re-encrypted text data $C_j$ in the temporary data storage unit 52 using the public parameters, the public key $pk_j$ of the apparatus 50, and the following verification formulas (step ST51).

$$e(C''_{2X}, u^{C_1} \cdot v) = e(C'_{2X}, C_4)$$

$$e(C''_{2Y}, u^{C_1} \cdot v) = e(C'_{2Y}, C_4)$$

$$e(C''_{2Z}, u^{C_1} \cdot v) = e(C'_{2Z}, C_4)$$

$$e(C''_{2Z1}, u^{C_1} \cdot v) = e(C'_{2Z1}, C_4)$$

$$e(C_{5Z}, C'_{2Z}) = e(C_{5X}, C'_{2X}) \cdot e(Y_{2j}, g)$$

$$e(C_{5Z}, C'_{2Z1}) = e(C_{5Y}, C'_{2Y}) \cdot e(X_{2j}, g_1)$$

$$\mathcal{V}(C_1, \sigma, (C_3, C_4)) = 1$$

If all seven verification formulas hold, the verification has succeeded; if at least one verification formula does not hold, the verification has failed.

If the verification has succeeded, the decryption processing unit 54 decrypts the re-encrypted text data $C_j$ using the private key $sk_j$ of the apparatus to obtain the message m (step ST52). This decryption is described by:

$$m = C_3 \Big/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\}$$

Whether or not the decryption result of the above equation is m can be verified by:

$$C_3 \Big/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\} =$$

$$C_3 \Big/ \left\{ \left( \frac{e(g^{(x_j + \beta y_j + \theta)/z_j k}, g^{z_j r k})}{e(g^{(x_j + \theta)/x_i s}, g^{x_i r s})} \right)^{\frac{1}{y_j}} \cdot \left( \frac{e(g^{(x_j + \beta y_j + \theta)/z_j k}, g^{\alpha z_j r k})}{e(g^{(\beta y_j + \theta)/y_i t}, g^{\alpha y_i r t})} \right)^{\frac{1}{x_j}} \right\} =$$

$$C_3 \Big/ \left\{ \left( \frac{e(g^{x_j + \beta y_j + \theta}, g^r)}{e(g^{x_j + \theta}, g^r)} \right)^{\frac{1}{y_j}} \cdot \left( \frac{e(g^{x_j + \beta y_j + \theta}, g^{\alpha r})}{e(g^{\beta y_j + \theta}, g^{\alpha r})} \right)^{\frac{1}{x_j}} \right\} =$$

$$m \cdot e(g_1 g_2, g)^r / (e(g, g)^{\beta r} \cdot e(g, g)^{\alpha r}) = m.$$

Note that this equation is described by rewriting $g_1 = g^\alpha$ and $g_2 = g^\beta$.

Note that the decryption processing unit 54 may skip the verification processing of step ST51, and may execute the decryption processing of step ST52. Also, when the re-encrypted text data $C_j$ does not include any verification data, the decryption processing unit 54 skips the verification processing of step ST51 and executes the decryption processing of step ST52. Furthermore, m may be a key in place of the message itself. For example, as for a symmetric key "key" in the symmetric key cryptosystem, m=key may be set to replace m by "key". In this case, ciphertext obtained by encrypting a message using the symmetric key "key" may be appended to the ciphertext data or re-encrypted text data. The same applies to the following embodiments and modifications.

Note that the order of processes may be changed as needed in this embodiment. For example, the order of the decryption processing and ciphertext verification processing may be changed. Likewise, since the re-encryption key generation processing does not require any parameter (more specifically, a random number) used upon execution of the encryption processing, the re-encryption key generation processing may be executed before the encryption processing.

As described above, according to this embodiment, since the re-encryption key $R_{ij}$ is generated based on the random number θ, even when the server and users collude, the decryption authority can be prevented from being re-transferred without any permission of a transfer source. In this manner, since extremely high reliability need not be required for the server, a file sharing system which can be used by the users more securely can be provided.

[Modification 1]

In the example described in the first embodiment, the encryption apparatus 20 generates ciphertext data, the re-encryption apparatus 40 re-encrypts the ciphertext data to generate re-encrypted text data, and the decryption apparatus 50 decrypts the re-encrypted text data. However, the first embodiment may be modified to a mode in which ciphertext data is decrypted without re-encryption. In this case, only the key setup processing, encryption processing, and decryption processing can be executed. The key setup processing in this modification is the same as that in the first embodiment. The encryption processing and decryption processing in this modification will be described below.

The difference between the encryption processing of this modification and that of the first embodiment is only in the final step. In order to give the following description while using the aforementioned symbols, let i be the identification informant of the decryption apparatus 50 for the sake of convenience. In this case, the communication unit 22 of the encryption apparatus 20 transmits ciphertext data $C_i$ in the temporary data storage unit 21 to the decryption apparatus 50 under the control of the control unit 25 (step ST24').

The decryption apparatus 50 verifies the ciphertext data $C_i$ generated by the encryption apparatus 20 in the same manner as in step ST41. If the verification has succeeded, the decryption apparatus 50 decrypts the ciphertext data $C_i$ using the private key $sk_i$ to obtain a message m. This decryption is described by:

$$m = C_3 \Big/ e(g_1 g_2, C_{2X})^{\frac{1}{x_i}}$$

Whether or not the decryption result of the above equation is m can be verified by:

$$m \cdot e(g_1 g_2, g)^r \Big/ e(g_1 g_2, C_{2X})^{\frac{1}{x_i}} =$$

$$m \cdot e(g_1 g_2, g)^r \Big/ e(g_1 g_2, g^{x_i r})^{\frac{1}{x_i}} = m \cdot e(g_1 g_2, g)^r / e(g_1 g_2, g)^r = m.$$

[Modification 2]

In addition to modification 1, as will be described below, the first embodiment may be modified to a mode in which ciphertext data is decrypted without re-encryption. In this case as well, only the key setup processing, encryption processing, and decryption processing can be executed. The key setup processing and decryption processing of this modification are the same as those in the first embodiment. The encryption processing and decryption processing of this modification will be described below. Note that j refers to identification information of the decryption apparatus 50 in this modification.

The encryption parameter generation unit 23 of the encryption apparatus 20 generates (ssk, svk) (step ST21') in the same manner as in step ST21 and sets the verification key svk in ciphertext data $C_1$ ($C_1$=svk).

Also, the encryption parameter generation unit 23 generates five random numbers; r, s, t, k, and $\theta \in Z_p^*$, and outputs them to the ciphertext generation unit 24.

The ciphertext generation unit 24 generates encrypted data $C_{2X'}$, $C_{2X''}$, $C_{2Y'}$, $C_{2Y''}$, $C_{2Z'}$, $C_{2Z''}$, $C_{2Z1'}$, $C_{2Z1''}$, $C_{2'''}$, $C_{5X}$, $C_{5Y}$, $C_{5Z}$, $C_3$, and $C_4$ with respect to a message $m \in G_T$ as plaintext data using these random numbers r, s, t, k, and $\theta$, and the public key $pk_j$ of the decryption apparatus 50 (step ST22'). These encrypted data are respectively given by:

$$C'_{2X} = Y_{2j}^s, \ C''_{2X} = Y_{2j}^{rs}, \ C'_{2Y} = X_j^t, \ C''_{2Y} = X_j^{rt}, \ C'_{2Z} = Y_{2j}^k,$$

$$C''_{2Z} = Y_{2j}^{rk}, \ C'_{2Z1} = X_j^k, \ C''_{2Z1} = X_j^{rk}, \ C_3 = e(g_1 g_2, g)^r \cdot m,$$

$$C_4 = (u^{svk} \cdot v)^r, \ C_{5X} = (g_1 \cdot g^\theta)^{\frac{1}{s}}, \ C_{5Y} = g^{\frac{\theta+1}{t}}, \ C_{5Z} = (g_1 \cdot g^{\theta+1})^{\frac{1}{k}}$$

After completion of step ST22', the ciphertext generation unit 24 generates a one-time signature σ in the same manner as in step ST23.

After that, the ciphertext generation unit 24 generates ciphertext data $C_j$=($C_1$, $C_{2X'}$, $C_{2X''}$, $C_{2Y'}$, $C_{2Y''}$, $C_{2Z'}$, $C_{2Z''}$, $C_{2Z1'}$, $C_{2Z1''}$, $C_{2'''}$, $C_{5X}$, $C_{5Y}$, $C_{5Z}$, $C_3$, $C_4$, σ) including all the encrypted data $C_1$ to $C_4$ and the one-time signature σ, and writes the obtained ciphertext data in the temporary data storage unit 21.

The communication unit 22 transmits the ciphertext data $C_j$ in the temporary data storage unit 21 to the decryption apparatus 50 under the control of the control unit 25.

The decryption apparatus 50 verifies the ciphertext data $C_j$ generated by the encryption apparatus 20 in the same manner as in step ST51. If the verification has succeeded, the decryption apparatus 50 decrypts the ciphertext data $C_j$ using the private key $sk_j$ to obtain a message m. This decryption is described by:

$$m = C_3 \Big/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\}$$

Whether or not the decryption result of the above equation is m can be verified by:

$$C_3 \Big/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\} =$$

$$C_3 \Big/ \left\{ \left( \frac{e(g^{(1+\alpha+\theta)/k}, g^{\beta y_j rk})}{e(g^{(\alpha+\theta)/s}, g^{\beta y_j rs})} \right)^{\frac{1}{y_j}} \cdot \left( \frac{e(g^{(1+\alpha+\theta)/k}, g^{x_j rk})}{e(g^{(\alpha+\theta)/t}, g^{x_j rt})} \right)^{\frac{1}{x_j}} \right\} =$$

$$C_3 \Big/ \left\{ \left( \frac{e(g^{1+\alpha+\theta}, g^{\beta r})}{e(g^{\alpha+\theta}, g^{\beta r})} \right) \cdot \left( \frac{e(g^{1+\alpha+\theta}, g^{r})}{e(g^{\alpha+\theta}, g^{r})} \right) \right\} =$$

$$m \cdot e(g_1 g_2, g)^r / (e(g, g)^{\beta r} \cdot e(g, g)^{\alpha r}) = m.$$

Note that the above equation is described by rewriting $g_1 = g^\alpha$ and $g_2 = g^\beta$.

[Modification 3]

In the example described in the first embodiment, the public parameters include the three members g, $g_1$, and $g_2$ of the system fixed values. However, the present invention is not limited to this. For example, the member $g_2$ may not be generated, and the public parameters may not include the member $g_2$. In this case, in the first embodiment, $g_2$=g may be set to replace $g_2$ by g. The same applies to the following embodiments and modifications.

[Modification 4]

In the example described in the first embodiment, the public parameters include the three members g, $g_1$, and $g_2$ of the system fixed values. However, the present invention is not limited to this. For example, the public parameters may include four or more members of the system fixed values. For example, when the public parameters include four members g, $g_1$, $g_2$, and $g_3$, $g_2$=$g_2 g_3$ may be set to replace $g_2$ by $g_2 g_3$ in the first embodiment. Also, for example, when the public parameters include five members g, $g_1$, $g_2$, $g_3$, and $g_4$, $g_1$=$g_1 g_3$ and $g_2$=$g_2 g_4$ may be set to respectively replace $g_1$ by $g_1 g_3$ and $g_2$ by $g_2 g_4$ in the first embodiment. The same applies to the following embodiments and modifications.

Second Embodiment

This embodiment will explain an example in which a re-encryption key is updated every certain period. As a parameter which expresses a period, a time parameter L is used. Of the key setup processing, encryption processing, re-encryption key generation processing, re-encryption processing, and decryption processing, the encryption processing, re-encryption key generation processing, and re-encryption processing use the time parameter. The time parameter is used as follows. For example, when the encryption processing is executed in a certain period $t_1$, the encryption processing to be described later is executed to have L=$t_1$; when the encryption processing is executed in the next period $t_2$, the encryption processing to be described later is executed to have L=$t_2$. The key setup processing, encryption processing, re-encryption key generation processing, re-encryption processing, and decryption processing of this embodiment will be described below. Note that parts common to the first embodiment described above will be described using the same reference numerals and a description thereof will not be repeated.

(1) Key Setup Processing

Public parameters are the same as those in the first embodiment. Letting i be identification information of a re-encryption key generator 30, a public key/private key generation unit 14 generates a private key $x_i$, $y_i$, $z_i$, $w_i \in Z_p^*$ of the re-encryption key generator 30, and generates a public key $pk_i$=($X_i$, $Y_{1i}$, $Y_{2i}$, $Z_i$, $Z_{1i}$, $W_i$, $W_{1i}$) (for $X_i$=$g^{x_i}$, $Y_{1i}$=$g_1^{y_i}$, $Y_{2i}$=$g_2^{y_i}$, $Z_i$=$g^{z_i}$, $Z_{1i}$=$g_1^{z_i}$, $W_i$=$g^{w_i}$, and $W_{1i}$=$g_1^{w_i}$) of the re-encryption key generator 30 using this private key $sk_i$=($x_i$, $y_i$, $z_i$, $w_i$) (step ST7).

Likewise, letting j be identification information of a decryption apparatus 50, the public key/private key generation unit 14 generates a private key $sk_j$=($x_j$, $y_j$, $z_j$, $w_j$) of the decryption apparatus 50, and generates a public key $pk_j$=($X_j$, $Y_{1j}$, $Y_{2j}$, $Z_j$, $Z_{1j}$, $W_j$, $W_{1j}$) (for $X_j$=$g^{x_j}$, $Y_{1j}$=$g_1^{y_j}$, $Y_{2j}$=$g_2^{y_j}$, $Z_j=g^{z_j}$, $Z_{1j}=g_1^{z_j}$, $W_j=g^{w_j}$, and $W_{1j}=g_1^{w_j}$) of the decryption apparatus 50 using this private key $sk_j$ (step ST10).

(2) Encryption Processing

As in the first embodiment, an encryption parameter generation unit 23 of an encryption apparatus 20 generates (ssk, svk) (step ST21), and sets a verification key svk in ciphertext data $C_1$ ($C_1$=svk).

Also, the encryption parameter generation unit 23 generates a random number $r \in Z_p^*$, and outputs it to a ciphertext generation unit 24.

The ciphertext generation unit 24 generates encrypted data $C_{2X}$, $C_{2Y}$, $C_{2Z}$, $C_{2Z1}$, $C_{2F}$, $C_3$, and $C_4$ with respect to a message $m \in G_T$ as plaintext data using this random number r, the public key $pk_i$ of the re-encryption key generator 30, and the time parameter L (step ST22). These encrypted data are respectively given by:

$$C_{2X}=X_i^r, C_{2Y}=Y_{1i}^r, C_{2Z}=Z_i^r, C_{2Z1}=Z_{1i}^r,$$

$$C_{2F}=F_i(L)^r, C_3=e(g_1,g_2,g)^r \cdot m, C_4=(u^{svk} \cdot v)^r$$

where a function $F_i(L)$ is defined by:

$$F_i(L)=g^L \cdot W_i=g^{L+w_i} (L \in \mathbb{Z})$$

After completion of step ST22, the ciphertext generation unit 24 generates, for the time parameter L and the encrypted data $C_3$ and $C_4$, a one-time signature σ by means of a signature generation function $\hat{S}$ in the public parameters and the signature key ssk generated in step ST21 (step ST23). The signature σ is described by:

$$\sigma = \hat{S}(ssk,(L,C_3,C_4))$$

After that, the ciphertext generation unit 24 generates ciphertext data $C_i$=(L, $C_1$, $C_{2X}$, $C_{2Y}$, $C_{2Z}$, $C_{2Z1}$, $C_{2F}$, $C_3$, $C_4$, σ) including the time parameter L, all the encrypted data $C_1$ to $C_4$, and the one-time signature σ, and writes the obtained ciphertext data in a temporary data storage unit 21.

(3) Re-Encryption Key Generation Processing

A random number generation unit 36 generates three random numbers; θ, $\delta_x$, and $\delta_y \in Z_p^*$, and outputs them to a re-encryption key generation unit 34.

The re-encryption key generation unit 34 generates a re-encryption key $R_{ijL}$, using these random numbers θ, $\delta_x$, and $\delta_y$, the private key $sk_i$ of the re-encryption key generator 30 in a private key storage unit 31, and the public key $pk_j$ of the decryption apparatus 50 in a temporary data storage unit 32 (step ST32). The re-encryption key $R_{ijL}$ is described by:

$$R_{ijL} = (R_{ijL1}, R_{ijL2}, R_{ijL3}, R_{ijL4}, R_{ijL5})$$

for $$R_{ijL1} = (X_j \cdot g^\theta)^{1/x_i} \cdot F_i(L)^{\delta_x} = g^{\frac{x_j+\theta}{x_i}+(L+w_i)\delta_x},$$

$$R_{ijL2} = (Y_{2j} \cdot g^\theta)1/y_i \cdot F_i(L)^{\delta_y} = g^{\frac{\beta y_j+\theta}{y_i}+(L+w_i)\delta_y},$$

$$R_{ijL3} = (X_j \cdot Y_{2j} \cdot g^\theta)^{1/z_i} = g^{\frac{x_j+\beta y_j+\theta}{z_i}},$$

$$R_{ijL4} = X_i^{\delta_x} = g^{x_i \delta_x}, R_{ijL5} = Y_{1i}^{\delta_y} = g^{\alpha y_i \delta_y}$$

Note that in the above, equations are described by rewriting $g_1=g^\alpha$ and $g_2=g^\beta$.

(4) Re-Encryption Processing

A re-encryption processing unit 44 verifies ciphertext data $C_i$ in a temporary data storage unit 42 using the public parameters, the time parameter L, and the following verification formulas (step ST41).

$$e(C_{2X}, u^{C_1} \cdot v) = e(X_i, C_4)$$

$$e(C_{2Y}, u^{C_1} \cdot v) = e(Y_{1i}, C_4)$$

$$e(C_{2Z}, u^{C_1} \cdot v) = e(Z_i, C_4)$$

$$e(C_{2Z1}, u^{C_1} \cdot v) = e(Z_{1i}, C_4)$$

$$e(C_{2F}, u^{C_1} \cdot v) = e(F_i(L), C_4)$$

$$\mathcal{V}_{(C_1,\sigma,(L,C_3,C_4))} = 1$$

Note that when all the five verification formulas hold, the verification has succeeded; when at least one verification formula does not hold, the verification has failed.

If the verification has succeeded, a re-encryption parameter generation unit 45 generates four random numbers; s, t, k, and $h \in Z_p^*$, and outputs them to a re-encryption processing unit 44.

The re-encryption processing unit 44 generates re-encrypted data $C'_{2X}$, $C''_{2X}$, $C'_{2Y}$, $C''_{2Y}$, $C'_{2Z}$, $C''_{2Z}$, $C'_{2Z1}$, $C''_{2Z1}$, $C'_{2F}$, $C''_{2F}$, $C_{5X}$, $C_{5Y}$, $C_{5Z}$, $C_{5FX}$, and $C_{5FY}$ using these random numbers s, t, k, and h, the ciphertext data $C_i$ in the temporary data storage unit 42, the re-encryption key $R_{ijL}$ in the temporary data storage unit 42, and the time parameter L (step ST42). These re-encrypted data are respectively described by:

$$C'_{2X} = X_i^s, C''_{2X} = C_{2X}^s = X_i^{rs}, C'_{2Y} = Y_{1i}^t, C''_{2Y} = C_{2Y}^t = Y_{1i}^{rt},$$

$$C'_{2Z} = Z_i^k, C''_{2Z} = C_{2Z}^k = Z_i^{rk}, C'_{2Z1} = Z_{1i}^k,$$

$$C''_{2Z1} = C_{2Z1}^k = Z_{1i}^{rk}, C'_{2F} = F_i(L)^h, C''_{2F} = C_{2F}^h = F_i(L)^{rh},$$

$$C_{5X} = R_{ijL1}^{\frac{1}{s}}, C_{5Y} = R_{ijL2}^{\frac{1}{t}}, C_{5Z} = R_{ijL3}^{\frac{1}{k}}, C_{5FX} = R_{ijL4}^{\frac{1}{h}}, C_{5FY} = R_{ijL5}^{\frac{1}{h}}$$

After completion of step ST42, the re-encryption processing unit 44 replaces the encrypted data C2X, C2Y, C2Z, C2Z1, C2F in the ciphertext data Ci by all the encrypted data re-encrypted data C2X' to C5FY to generate re-encrypted text data Cj=(C1, C2X', C2X'', C2Y', C2Y'', C2Z', C2X'', C2Z1', C2Z1'', C2F', C2F'', C5X, C5Y, C5Z, C5FX, C5FY, C3, C4, σ), and writes the obtained re-encrypted text data Cj in the temporary data storage unit 42.

(5) Decryption Processing

A decryption processing unit 54 verifies the re-encrypted text data $C_j$ in a temporary data storage unit 52 using the public parameters, the public key $pk_j$ of the apparatus 50, and the following verification formulas (step ST51).

$$e(C''_{2X}, u^{C_1} \cdot v) = e(C'_{2X}, C_4)$$

$$e(C''_{2Y}, u^{C_1} \cdot v) = e(C'_{2Y}, C_4)$$

$$e(C''_{2Z}, u^{C_1} \cdot v) = e(C'_{2Z}, C_4)$$

$$e(C''_{2Z1}, u^{C_1} \cdot v) = e(C'_{2Z1}, C_4)$$

$$e(C_{5Z} C'_{2Z}) \cdot e(C_{5FX}, C'_{2F}) = e(C_{5X}, C'_{2X} \cdot e(Y_{2j}, g))$$

$$e(C_{5Z} C'_{2Z1}) \cdot e(C_{5FX}, C'_{2F}) = e(C_{5X}, C'_{2X} \cdot e(X_j, g_1))$$

$$\mathcal{V}_{(C_1,\sigma,(L,C_3,C_4))} = 1$$

If all the eight verification formulas hold, the verification has succeeded; if at least one verification formula does not hold, the verification has failed.

If the verification has succeeded, the decryption processing unit 54 decrypts the re-encrypted text data $C_j$ using the private key $sk_j$ of the apparatus to obtain a message m (step ST52). This decryption is described by:

$$m = C_3 \bigg/ \left\{ \left( \frac{e(C_{5Z}, C''_{2Z}) \cdot e(C_{5FX}, C''_{2F})}{e(C_{5X}, C''_{2X})} \right)^{\frac{1}{y_j}} \cdot \left( \frac{e(C_{5Z}, C''_{2Z1}) \cdot e(C_{5Y}, C''_{2F})}{e(C_{5Y}, C''_{2Y})} \right)^{\frac{1}{x_j}} \right\}$$

Whether or not the decryption result of the above equation is m can be verified by:

$$C_3 \bigg/ \left\{ \left( \frac{e(C_{5Z}, C''_{2Z}) \cdot e(C_{5FX}, C''_{2F})}{e(C_{5X}, C''_{2X})} \right)^{\frac{1}{y_j}} \cdot \left( \frac{e(C_{5Z}, C''_{2Z1}) \cdot e(C_{5Y}, C''_{2F})}{e(C_{5Y}, C''_{2Y})} \right)^{\frac{1}{x_j}} \right\} =$$

$$C_3 \bigg/ \left\{ \left( \frac{e\left(g^{\frac{x_j \beta y_j + \theta}{z_j k}}, g^{z_i rk}\right) \cdot e\left(g^{\frac{x_j \delta_x}{h}}, g^{(L+w_i)rh}\right)}{e\left(g^{\frac{((x_j+\theta)/x_i) + (L+w_i)\delta_x}{s}}, g^{x_i rs}\right)} \right)^{\frac{1}{y_j}} \cdot \right.$$

$$\left. \left( \frac{e\left(g^{\frac{x_j \beta y_j + \theta}{z_j k}}, g^{\alpha z_i rk}\right) \cdot e\left(g^{\frac{\alpha y_i \delta_y}{h}}, g^{(L+w_i)rh}\right)}{e\left(g^{\frac{((\beta y_j+\theta)/y_i) + (L+w_i)\delta_y}{t}}, g^{\alpha y_i rt}\right)} \right)^{\frac{1}{x_j}} \right\} =$$

$$C_3 \bigg/ \left\{ \left( \frac{e(g^{x_j + \beta y_j + \theta}, g^r) \cdot e(g^{x_i \delta_x}, g^{(L+w_i)r})}{e\left(g^{\frac{(x_j+\theta)+(L+w_i)x_i \delta_x}{s}}, g^r\right)} \right)^{\frac{1}{y_j}} \cdot \right.$$

$$\left. \left( \frac{e(g^{x_j+\beta y_j+\theta}, g^{\alpha r}) \cdot e(g^{\alpha y_i \delta_y}, g^{(L+w_i)r})}{e\left(g^{(\beta y_j+\theta)+(L+w_i)y_i \delta_y}, g^{\alpha r}\right)} \right)^{\frac{1}{x_j}} \right\} =$$

$$m \cdot e(g_1 g_2, g)^r / (e(g, g)^{\beta r} \cdot e(g, g)^{\alpha r}) = m.$$

Note that this equation is described by rewriting $g_1 = g^\alpha$ and $g_2 = g^\beta$.

Note that the order of processes may be changed as needed in this embodiment. For example, the order of the decryption processing and ciphertext verification processing may be changed. Likewise, the re-encryption key generation processing may be executed before the encryption processing.

As described above, according to this embodiment, since the re-encryption key is generated based on the random numbers $\theta$, $\delta_x$, and $\delta_y$, and the time parameter L, whether or not to transfer the decryption authority can be decided for each period, thus allowing flexible access control, in addition to the effects of the first embodiment. Thus, even after the decryption authority about ciphertext for a user A is transferred to a user B in a certain period, the decryption authority about ciphertext for the user A is not given to the user B in the next period, that is, the decryption authority of the user B (about ciphertext for the user A) can be invalidated, thus providing a more convenient file sharing system.

[Modification 5]

In the example described in the second embodiment, the encryption apparatus 20 generates ciphertext data, a re-encryption apparatus 40 re-encrypts the ciphertext data to generate re-encrypted text data, and the decryption apparatus 50 decrypts the re-encrypted text data. However, the second embodiment may be modified to a mode in which ciphertext data is decrypted without re-encryption. In this case, only the key setup processing, encryption processing, and decryption processing can be executed. The key setup processing in this modification is the same as that in the second embodiment. The encryption processing and decryption processing in this modification will be described below.

The difference between the encryption processing of this modification and that of the second embodiment is only in the final step. In order to give the following description while using the aforementioned symbols, let i be the identification informant of the decryption apparatus 50 for the sake of convenience. In this case, a communication unit 22 of the encryption apparatus 20 transmits ciphertext data $C_i$ in the temporary data storage unit 21 to the decryption apparatus 50 under the control of a control unit 25 (step ST24').

The decryption apparatus 50 verifies the ciphertext data $C_i$ generated by the encryption apparatus 20 in the same manner as in step ST41. If the verification has succeeded, the decryption apparatus 50 decrypts the ciphertext data $C_i$ using the private key $sk_i$ to obtain a message m. This decryption is described by:

$$m = C_3 \bigg/ e(g_1 g_2, C_{2X})^{\frac{1}{x_i}}$$

Whether or not the decryption result of the above equation is m can be verified by:

$$m \cdot e(g_1 g_2, g)^r \bigg/ e(g_1 g_2, C_{2X})^{\frac{1}{x_i}} =$$

$$m \cdot e(g_1 g_2, g)^r \bigg/ e(g_1 g_2, g^{x_i r})^{\frac{1}{x_i}} = m \cdot e(g_1 g_2, g)^r / e(g_1 g_2, g)^r = m.$$

[Modification 6]

In addition to modification 5, as will be described below, the first embodiment may be modified to an aspect in which ciphertext data is decrypted without re-encryption. In this case as well, only the key setup processing, encryption processing, and decryption processing can be executed. The key setup processing and decryption processing of this modification are the same as those in the second embodiment. The encryption processing and decryption processing of this modification will be described below. Note that j refers to identification information of the decryption apparatus 50 in this modification.

The encryption parameter generation unit 23 of the encryption apparatus 20 generates (ssk, svk) (step ST21') in the same manner as in step ST21 and sets the verification key svk in ciphertext data $C_1$ ($C_1$=svk).

Also, the encryption parameter generation unit 23 generates eight random numbers; r, s, t, k, h, $\theta$, $\delta_x$, and $\delta_y \in Z_p^*$, and outputs them to the ciphertext generation unit 24.

The ciphertext generation unit 24 generates encrypted data $C_{2X'}$, $C_{2X'''}$, $C_{2Y'}$, $C_{2Y'''}$, $C_{2Z'}$, $C_{2Z'''}$, $C_{2Z1'}$, $C_{2Z1'''}$, $C_{2F'}$, $C_{2F}$, $C_{5X}$, $C_{5Y}$, $C_{5Z}$, $C_{5FX}$, $C_{5FY}$, $C_3$, and $C_4$ with respect to a message $m \in G_T$ as plaintext data using these random numbers r, s, t, k, h, $\theta$, $\delta_x$, and $\delta_y$, the public key $pk_j$ of the decryption apparatus 50, and the time parameter L (step ST22'). These encrypted data are respectively given by:

$$C'_{2X} = Y^s_{2j}, \; C''_{2X} = Y^{rs}_{2j}, \; C'_{2Y} = X^t_j, \; C''_{2Y} = X^{rt}_j, \; C'_{2Z} = Y^k_{2j},$$

$$C''_{2Z} = Y^{rk}_{2j}, \; C'_{2Z1} = X^k_j, \; C''_{2Z1} = X^{rk}_j, \; C'_{2F} = F_i(L)^h, \; C''_{2F} = F_i(L)^{rh}$$

$$C_3 = e(g_1 g_2, g)^r \cdot m, \; C_4 = (u^{svk} \cdot v)^r,$$

$$C_{5X} = (g_1 \cdot g^\theta \cdot F_j(L)^{\delta_y})^{\frac{1}{s}} = g^{\frac{\alpha+\theta+(L+w_j)\delta_y}{s}},$$

$$C_{5Y} = (g^{1+\theta} \cdot F_j(L)^{\delta_x})\frac{1}{t} = g^{\frac{1+\theta+(L+w_j)\delta_x}{t}},$$

$$C_{5Z} = (g_1 \cdot g^{1+\theta})^{\frac{1}{k}} = g^{\frac{\alpha+1+\theta}{k}}, \; C_{5FX} = (Y_{2j})^{\frac{\delta_y}{h}}, \; C_{5FY} = (X_j)^{\frac{\delta_x}{h}}$$

After completion of step ST22', the ciphertext generation unit 24 generates a one-time signature σ in the same manner as in step ST23.

After that, the ciphertext generation unit 24 generates ciphertext data $C_j=(L, C_{2X'}, C_{2X''}, C_{2Y'}, C_{2Y''}, C_{2Z'}, C_{2Z''}, C_{2Z1'}, C_{2Z1''}, C_{2F'}, C_{2F''}, C_{5X}, C_{5Y}, C_{5Z}, C_{5FX}, C_{5FY}, C_3, C_4, σ)$ including the time parameter L, all the encrypted data $C_1$ to $C_4$ and the one-time signature σ, and writes the obtained ciphertext data in the temporary data storage unit 21.

The communication unit 22 transmits the ciphertext data $C_j$ in the temporary data storage unit 21 to the decryption apparatus 50 under the control of the control unit 25.

The decryption apparatus 50 verifies the ciphertext data $C_j$ generated by the encryption apparatus 20 in the same manner as in step ST51. If the verification has succeeded, the decryption apparatus 50 decrypts the ciphertext data $C_j$ using the private key $sk_j$ to obtain a message m. This decryption is described by:

$$m = C_3 \bigg/ \left\{ \left(\frac{e(C_{5Z}, C''_{2Z}) \cdot e(C_{5FX}, C''_{2F})}{e(C_{5X} \cdot C''_{2X})}\right)^{\frac{1}{y_j}} \cdot \left(\frac{e(C_{5Z} \cdot C''_{2Z1}) \cdot e(C_{5FY}, C''_{2F})}{e(C_{5Y} \cdot C''_{2Y})}\right)^{\frac{1}{x_j}} \right\}$$

Whether or not the decryption result of the above equation is m can be verified by:

$$C_3 \bigg/ \left\{ \left(\frac{e(C_{5Z}, C''_{2Z}) \cdot e(C_{5FX}, C''_{2F})}{e(C_{5X} \cdot C''_{2X})}\right)^{\frac{1}{y_j}} \cdot \left(\frac{e(C_{5Z} \cdot C''_{2Z1}) \cdot e(C_{5FY}, C''_{2F})}{e(C_{5Y} \cdot C''_{2Y})}\right)^{\frac{1}{x_j}} \right\} =$$

$$C_3 \bigg/ \left\{ \left(\frac{e\left(g^{\frac{\alpha+1+\theta}{k}}, g^{\beta y_j rk}\right) \cdot e\left(g^{\frac{\beta y_j \delta_y}{h}}, g^{(L+w_j)rh}\right)}{e\left(g^{\frac{\alpha+\theta+(L+w_i)\delta_y}{s}}, g^{\beta j rs}\right)}\right)^{\frac{1}{y_j}} \cdot \right.$$

$$\left. \left(\frac{e\left(g^{\frac{\alpha+1+\theta}{k}}, g^{x_j rk}\right) \cdot e\left(g^{\frac{x_j \delta_y}{h}}, g^{(L+w_j)rh}\right)}{e\left(g^{\frac{1+\theta+(L+w_j)\delta_x}{t}}, g^{x_j rt}\right)}\right)^{\frac{1}{x_j}} \right\} =$$

$$C_3 \bigg/ \left\{ \left(\frac{e(g^{\alpha+1+\theta}, g^{\beta r}) \cdot e(g^{\beta\delta_y}, g^{(L+w_j)r})}{e(g^{\alpha+1+\theta(L+w_j)\delta_y}, g^{\beta r})}\right)^{\frac{1}{y_j}} \cdot \right.$$

$$\left. \left(\frac{e(g^{x_j+\beta y_j+\theta}, g^{\alpha r}) \cdot e(g^{\alpha y_i \delta_y}, g^{(L+w_i)r})}{e(g^{1+\theta+(L+w_j)\delta_x}, g^r)}\right)^{\frac{1}{x_j}} \right\} =$$

$$m \cdot e(g_1 g_2, g)^r / (e(g, g)^{\beta r} \cdot e(g, g)^{\alpha r}) = m.$$

Note that the above equation is described by rewriting $g_1 = g^\alpha$ and $g_2 = g^\beta$.

According to at least one of the aforementioned embodiments, since a re-encryption key is generated based on a random number, even when the server and users collude, the decryption authority can be prevented from being re-transferred without any permission of a transfer source.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to each embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each embodiment on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A re-encryption key generator, which generates a re-encryption key required to obtain re-encrypted text data, which is configured to be decrypted by means of a second private key of a second user device, by re-encrypting, without decrypting, ciphertext data obtained by encrypting plaintext data by means of a first public key of a first user device, the generator comprising:
- a first storage device which stores a first private key corresponding to the first public key;
- a second storage device which stores a second public key corresponding to the second private key;
- a first random number generation device which generates a first random number; and
- a re-encryption key generation device which generates the re-encryption key based on the first private key, the second public key, and the first random number,
- wherein the first public key is generated based on the first private key and a plurality of system fixed values,
- wherein the second public key is generated based on the second private key and the plurality of system fixed values,
- wherein the re-encryption key includes a power index which includes a numerator portion and a denominator portion,
- wherein the numerator portion of the power index of the re-encryption key has a form of linear coupling based on a power index related to respective ones of the plurality of system fixed values, the second private key corresponding to the second public key, and the first random number,
- wherein the denominator portion of the power index of the re-encryption key includes the first private key,
- wherein the ciphertext data is generated based on the first public key and the second random number, and
- wherein the re-encrypted text data is generated based on the ciphertext data, the re-encryption key, a third random number, a fourth random number, and a fifth random number.

2. The re-encryption key generator according to claim 1, wherein the re-encryption key generation device generates the re-encryption key based on the first private key, the second public key, and the first random number independently of ciphertext data before re-encryption.

3. The re-encryption key generator according to claim 2, wherein when the first private key is represented by $sk_i=(x_i, y_i, z_i)$, the second private key is represented by $sk_j=(x_j, y_j, z_j)$, the first random number is represented by $\theta$, the plurality of system fixed value are represented by $g$, $g_1$, and $g_2$ (for $g$, $g_1$, and $g_2 \in G$ if bilinear map groups as groups of prime orders p including a bilinear map e: $G \times G \to G_1$ are represented by $G$ and $G_T$), letting $\beta$ be the power index related to the respective system fixed values (for $g_2=g^\beta$), and $R_{ij}$ be the re-encryption key, the re-encryption key $R_{ij}$ is described by:

$$R_{ij} = (R_{ij1}, R_{ij2}, R_{ij3})$$
$$\left(\text{for } R_{ij1} = g^{\frac{x_j+\theta}{x_i}}, R_{ij2} = g^{\frac{\beta y_j+\theta}{y_i}}, R_{ij3} = g^{\frac{x_j+\beta y_j+\theta}{z_i}}\right),$$

when the first public key is represented by $pk_i$, the first public key $pk_i$ is described by:

$$pk_i=(X_i,Y_{1i},Y_{2i},Z_i,Z_{1i})$$

(for
$X_i=g^{x_i}, Y_{1i}=g_1^{y_i}, Y_{2i}=g_2^{y_i}, Z_i=g^{z_i}, Z_{1i}=g_1^{z_i}$
),
when the second public key is represented by $pk_j$, the first public key $pk_j$ is described by:

$$pk_j=(X_j,Y_{1j},Y_{2j},Z_j,Z_{1j})$$

(for
$X_j=g^{x_j}, Y_{1j}=g_1^{y_j}, Y_{2j}=g_2^{y_j}, Z_j=g^{z_j}, Z_{1j}=g_1^{z_j}$
),
when the plaintext data is represented by m (for $m \in G_T$), a second random number is represented by r, and the ciphertext data is expressed by $C_i$ (the bilinear map e: $G \times G \to G_T$ is expressed by $e(,)$), the ciphertext data $C_i$ is described by:

$$C_i=(C_{2X},C_{2Y},C_{2Z},C_{2Z1},C_3)$$

(for
$C_{2X}=X_i^r, C_{2Y}=Y_{1i}^r, C_{2Z}=Z_i^r, C_{2Z1}=Z_{1i}^r, C_3=e(g_1 g_2, g)^r \cdot m$
),
when the re-encrypted text data is represented by $C_j$ (the third random number, the fourth random number, and the fifth random number are represented by s, t, and k), the re-encrypted text data $C_j$ is described by:

$$C_j=(C_{2X''},C_{2Y''},C_{2Z''},C_{2Z1''},C_{5X},C_{5Y},C_{5Z},C_3)$$

(for
$C''_{2X}=C_{2X}^s=X_i^{rs}, C''_{2Y}=C_{2Y}^t=Y_{1i}^{rt}, C''_{2Z}=C_{2Z}^k=Z_i^{rk}$,
$C''_{2Z1}=C_{2Z1}^k=Z_{1i}^{rk}$,
$C_{5X}=R_{ij1}^{1/s}, C_{5Y}=R_{ij2}^{1/t}, C_{5Z}=R_{ij3}^{1/k}$
), and
a relationship among the plaintext data m, the re-encrypted text data $C_j$, and the second private key $sk_j$ is expressed by:

$$m = C_3 \Big/ \left\{ \left(\frac{e(C_{5Z} \cdot C''_{2Z})}{e(C_{5X} \cdot C''_{2X})}\right)^{\frac{1}{y_j}} \cdot \left(\frac{e(C_{5Z} \cdot C''_{2Z1})}{e(C_{5Y} \cdot C''_{2Y})}\right)^{\frac{1}{x_j}} \right\}.$$

4. A re-encryption apparatus configured to communicate with a re-encryption key generator, which generates a re-encryption key required to obtain re-encrypted text data, which is configured to be decrypted by means of a second private key of a second user device, by re-encrypting, without decrypting, ciphertext data obtained by encrypting plaintext data by means of a first public key of a first user device, the apparatus comprising:
- a storage device which stores the re-encryption key received from the re-encryption key generator;
- a re-encryption device which obtains the re-encrypted text data by re-encrypting, without decrypting, the ciphertext data received from the first user device by means of the re-encryption key in the storage device; and
- a device which transmits the obtained re-encrypted text data to the second user device,
- wherein the re-encryption key is generated based on a first private key corresponding to the first public key, a second public key corresponding to the second private key, and a first random number generated by the re-encryption key generator,
- wherein the first public key is generated based on the first private key and a plurality of system fixed values,
- wherein the second public key is generated based on the second private key and the plurality of system fixed values,
- wherein the re-encryption key includes a power index which includes a numerator portion and a denominator portion,
- wherein the numerator portion of the power index of the re-encryption key has a form of linear coupling based on a power index related to respective ones of the plurality of system fixed values, the second private key corresponding to the second public key, and the first random number, wherein the denominator portion of the power index of the re-encryption key includes the first private key, wherein the ciphertext data is generated based on the first public key and the second random number, and wherein the re-encrypted text data is generated based on the ciphertext data, the re-encryption key, a third random number, a fourth random number, and a fifth random number.

5. The re-encryption apparatus according to claim 4, wherein the re-encryption key is generated independently of ciphertext data before re-encryption.

6. A program which is executed by a processor of a re-encryption key generator, which generates a re-encryption key required to obtain re-encrypted text data, which is configured to be decrypted by means of a second private key of a second user device, by re-encrypting, without decrypting, ciphertext data obtained by encrypting plaintext data by means of a first public key of a first user device, and which is stored in a non-transitory computer-readable storage medium, the program comprising:

a first program code for controlling the processor to execute processing for writing a first private key corresponding to the first public key in a first storage device of the re-encryption key generator;

a second program code for controlling the processor to execute processing for writing a second public key corresponding to the second private key in a second storage device of the re-encryption key generator;

a third program code for controlling the processor to execute processing for generating a first random number; and a fourth program code for controlling the processor to execute processing for generating the re-encryption key based on the first private key, the second public key, and the first random number, wherein the first public key is generated based on the first private key and a plurality of system fixed values, wherein the second public key is generated based on the second private key and the plurality of system fixed values, wherein the re-encryption key includes a power index which includes a numerator portion and a denominator portion, wherein the numerator portion of the power index of the re-encryption key has a form of linear coupling based on a power index related to respective ones of the plurality of system fixed values, the second private key corresponding to the second public key, and the first random number, wherein the denominator portion of the power index of the re-encryption key includes the first private key, wherein the ciphertext data is generated based on the first public key and the second random number, and wherein the re-encrypted text data is generated based on the ciphertext data, the re-encryption key, a third random number, a fourth random number, and a fifth random number.

7. The program according to claim 6, wherein the processing for generating the re-encryption key is executed by the processor independently of ciphertext data before re-encryption.

8. A program which is executed by a processor of a re-encryption apparatus configured to communicate with a re-encryption key generator, which generates a re-encryption key required to obtain re-encrypted text data, which is configured to be decrypted by means of a second private key of a second user device, by re-encrypting, without decrypting, ciphertext data obtained by encrypting plaintext data by means of a first public key of a first user device, and which is stored in a non-transitory computer-readable storage medium, the program comprising:

a first program code for controlling the processor to execute processing for writing the re-encryption key received from the re-encryption key generator in a storage device of the re-encryption apparatus;

a second program code for controlling the processor to execute processing for obtaining the re-encrypted text data by re-encrypting, without decrypting, the ciphertext data received from the first user device by means of the re-encryption key in the storage device; and a third program code for controlling the processor to execute processing for transmitting the obtained re-encrypted text data to the second user device, wherein the re-encryption key is generated based on a first private key corresponding to the first public key, a second public key corresponding to the second private key, and a first random number generated by the re-encryption key generator, wherein the first public key is generated based on the first private key and a plurality of system fixed values, wherein the second public key is generated based on the second private key and the plurality of system fixed values, wherein the re-encryption key includes a power index which includes a numerator portion and a denominator portion, wherein the numerator portion of the power index of the re-encryption key has a form of linear coupling based on a power index related to respective ones of the plurality of system fixed values, the second private key corresponding to the second public key, and the first random number, wherein the denominator portion of the power index of the re-encryption key includes the first private key, wherein the ciphertext data is generated based on the first public key and the second random number, and wherein the re-encrypted text data is generated based on the ciphertext data, the re-encryption key, a third random number, a fourth random number, and a fifth random number.

9. The program according to claim 8, wherein the re-encryption key is generated independently of ciphertext data before re-encryption.

10. A program which is executed by a processor of an encryption apparatus configured to communicate with a re-encryption apparatus using a re-encryption key required to obtain re-encrypted text data, which is configured to be decrypted by means of a second private key of a second user device, by re-encrypting, without decrypting, ciphertext data obtained by encrypting plaintext data by means of a first public key of a first user device, and which is stored in a non-transitory computer-readable storage medium, the program comprising:

a first program code for controlling the processor to execute processing for writing the first public key in a storage device of the encryption apparatus;

a second program code for controlling the processor to execute processing for obtaining the ciphertext data by encrypting the plaintext data using the first public key in the storage device; and a third program code for controlling the processor to execute processing for transmitting the obtained ciphertext data to the re-encryption apparatus, wherein the re-encryption key is generated based on a first private key corresponding to the first public key, a second public key corresponding to the second private key, and a first random number generated by the re-encryption key generator, wherein the first public key is generated based on the first private key and a plurality of system fixed values, wherein the second public key is generated based on the second private key and the plurality of system fixed values, wherein the re-encryption key includes a power index which includes a numerator portion and a denominator portion, wherein the numerator portion of the power index of the re-encryption key has a form of linear coupling based on a power index related to respective ones of the plurality of system fixed values, the second private key corresponding to the second public key, and the first random number, wherein the denominator portion of the power index of the re-encryption key includes the first private key, wherein the ciphertext data is generated based on the first public key and the second random number, and wherein the re-encrypted text data is generated based on the ciphertext data, the re-encryption key, a third random number, a fourth random number, and a fifth random number.

11. The program according to claim 10, wherein the re-encryption key is generated independently of ciphertext data before re-encryption.

12. A program which is executed by a decryption apparatus, which decrypts re-encrypted text data received from an re-encryption apparatus after the re-encryption apparatus re-encrypts, without decrypting, plaintext data by means of a first public key of a first user device to obtain the re-encrypted text data configured to be decrypted by means of a second private key of a second user device, and which is stored in a non-transitory computer-readable storage medium, the program comprising:

a first program code for controlling the processor to execute processing for writing the second private key in a storage device of the decryption apparatus; and a second program code for controlling the processor to execute processing for decrypting the re-encrypted text data received from the re-encryption apparatus based on the second private key in the storage device to obtain the plaintext data, wherein the re-encryption key is generated based on a first private key corresponding to the first public key, a second public key corresponding to the second private key, and a first random number generated by a re-encryption key generator which generates the re-encryption key, wherein the first public key is generated based on the first private key and a plurality of system fixed values, wherein the second public key is generated based on the second private key and the plurality of system fixed values, wherein the re-encryption key includes a power index which includes a numerator portion and a denominator portion, wherein the numerator portion of the power index of the re-encryption key has a form of linear coupling based on a power index related to respective ones of the plurality of system fixed values, the second private key corresponding to the second public key, and the first random number, wherein the denominator portion of the power index of the re-encryption key includes the first private key, wherein the ciphertext data is generated based on the first public key and the second random number, and wherein the re-encrypted text data is generated based on the ciphertext data, the re-encryption key, a third random number, a fourth random number, and a fifth random number.

13. The program according to claim 12, wherein the re-encryption key is generated independently of ciphertext data before re-encryption.

* * * * *